(12) United States Patent
Salyers et al.

(10) Patent No.: US 9,268,651 B1
(45) Date of Patent: Feb. 23, 2016

(54) EFFICIENT RECOVERY OF STORAGE GATEWAY CACHED VOLUMES

(71) Applicant: Amazon Technologies, Inc., Reno, NV (US)

(72) Inventors: David Carl Salyers, Seattle, WA (US); Ankur Khetrapal, Seattle, WA (US); Pradeep Vincent, Kenmore, WA (US); Kestutis Patiejunas, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 566 days.

(21) Appl. No.: 13/665,685

(22) Filed: Oct. 31, 2012

(51) Int. Cl.
*G06F 12/00* (2006.01)
*G06F 11/14* (2006.01)

(52) U.S. Cl.
CPC .................................. *G06F 11/1464* (2013.01)

(58) Field of Classification Search
CPC ............................. G06F 3/067; G06F 11/1464
See application file for complete search history.

(56) References Cited

U.S. PATENT DOCUMENTS

| | | | |
|---|---|---|---|
| 7,130,956 B2 | 10/2006 | Rao | |
| 7,340,639 B1 | 3/2008 | Lee et al. | |
| 7,340,652 B2 | 3/2008 | Jarvis et al. | |
| 7,523,286 B2 | 4/2009 | Ramany et al. | |
| 7,624,170 B2 | 11/2009 | Das et al. | |
| 7,734,598 B2 | 6/2010 | Noguchi et al. | |
| 7,797,323 B1 | 9/2010 | Eshghi et al. | |
| 8,019,882 B2 | 9/2011 | Rao et al. | |
| 8,112,477 B2 | 2/2012 | Rao et al. | |
| 2008/0189774 A1 | 8/2008 | Ansari et al. | |
| 2010/0125730 A1 | 5/2010 | Dodgson et al. | |
| 2010/0146074 A1 | 6/2010 | Srinivasan | |
| 2010/0290422 A1 | 11/2010 | Haigh et al. | |
| 2012/0173558 A1* | 7/2012 | Sorenson, III | ................ 707/758 |
| 2015/0012706 A1* | 1/2015 | Blinick | ............... G06F 12/0802 711/119 |

OTHER PUBLICATIONS

U.S. Appl. No. 13/212,960, filed Aug. 18, 2011, James Christopher Sorenson, III, et al.
U.S. Appl. No. 13/174,140, filed Jun. 30, 2011, James Christopher Sorenson, III, et al.
U.S. Appl. No. 13/174,505, filed Jun. 30, 2011, James Christopher Sorenson, III, et al.
Storsimple, "Cloud-integrated Enterprise Storage," downloaded from www.storsimple.com/total-storage/ on Oct. 22, 2012, 1 pages.

(Continued)

*Primary Examiner* — Larry Mackall
(74) *Attorney, Agent, or Firm* — Robert C. Kowert; Meyertons, Hood, Kivlin, Kowert & Goetzel, P.C.

(57) ABSTRACT

Methods and apparatus for efficient recovery of cached volumes at storage gateways are disclosed. To recover, after an unplanned shutdown, a storage gateway appliance configured to cache chunks of a storage object, chunk metadata corresponding to a particular chunk is read into an in-memory metadata region from a first metadata location. Based on analysis of the chunk metadata, a validation requirement indication for the particular chunk is stored, and the chunk is designated as being accessible for client I/O requests. In response to receiving a subsequent I/O request targeted to the particular chunk, the chunk metadata is validated using a different metadata location prior to performing the requested I/O operation.

23 Claims, 14 Drawing Sheets

(56) References Cited

OTHER PUBLICATIONS

Nasuni Corporation, "What is Nasuni?," downloaded from www.nasuni.com/what_is_nasuni on Oct. 22, 2012, pp. 1-2.
TwinStrata, Inc., "CloudArray® Cloud Storage Gateway Overview," downloaded from www.twinstrata.com/CloudArray-overview on Oct. 22, 2012, pp. 1-2.
Stephen Lawson, "Gluster Pushes Storage Software to VMware, Amazon," PCWorld online article, Feb. 7, 2011, pp. 1-3.
Krishnan Subramanian, "Gluster Introduces Scale-Out NAS Virtual Storage Appliances for VMware and AWS," CloudAve online article, Feb. 9, 2011, pp. 1-3.
A. Epstein, D. H. Lorenz, E. Silvera, I. Shapira, "Virtual Appliance Content Distribution for a Global Infrastructure Cloud Service," Infocom'10 Proceedings IEEE, Mar. 2010, pp. 1-9.
Liu, et al., "Low-cost application image distribution on worldwide cloud front server," Computer Communications Workshops (Infocom Wkshps), 2011 IEEE Conference, Apr. 2011, pp. 1-6.
M. Armbrust, et al., "Above the Clouds: A Berkeley View of Cloud computing," Technical Report No. UCB/EECS-2009-28, University of California at Berkley, USA, Feb. 10, 2009, pp. 1-23.
Stephanie Balaouras, "How the Cloud Will Transform Disaster Recovery Services," Forrester Research, Inc., Jul. 24, 2009, pp. 1-14.
U.S. Appl. No. 12/981,172, filed Dec. 29, 2010, Amazon Technologies, Inc.
U.S. Appl. No. 12/981,393, filed Dec. 29, 2010, Amazon Technologies, Inc.
U.S. Appl. No. 12/981,397, filed Dec. 29, 2010, Amazon Technologies, Inc.
U.S. Appl. No. 13/665,708, filed Oct. 31 2012, David Carl Salyers.
U.S. Appl. No. 13/174,156, filed Jun. 30, 2011, Amazon Technologies, Inc.
U.S. Appl. No. 13/174,524, filed Jun. 30, 2011, Amazon Technologies, Inc.
U.S. Appl. No. 13/174,172, filed Jun. 30, 2011, Amazon Technologies, Inc.
U.S. Appl. No. 13/327,605, filed Dec. 15, 2011, Amazon Technologies, Inc.
U.S. Appl. No. 13/174,203, filed Jun. 30, 2011, Amazon Technologies, Inc.
U.S. Appl. No. 13/174,513, filed Jun. 30, 2011, Amazon Technologies, Inc.
U.S. Appl. No. 13/665,709, filed Oct. 31 2012, David Carl Salyers.
U.S. Appl. No. 13/174,489, filed Jun. 30, 2011, Amazon Technologies, Inc.
U.S. Appl. No. 13/324,907, filed Dec. 13, 2011, Amazon Technologies, Inc.
U.S. Appl. No. 13/665,705, filed Oct. 31 2012, David Carl Salyers.
U.S. Appl. No. 13/665,707, filed Oct. 31 2012, Pradeep Vincent.

\* cited by examiner

EFFICIENT RECOVERY OF STORAGE GATEWAY CACHED VOLUMES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware maintained at a remote, network-accessible storage service to be shared among multiple users. Each user or client may be provided with a virtualized data store which may be distributed across multiple data storage devices, with each such virtualized data store acting as a distinct logical data store that provides clients with the illusion that they are the sole operators and administrators of the data storage resources. Using such storage virtualization techniques, it may be possible for some clients to reduce the capital and management expenses associated with maintaining large amounts of data storage on client premises. Storing or replicating client data at remote storage services may also provide other benefits such as simplified backup and/or easier disaster recovery.

Figure 1:
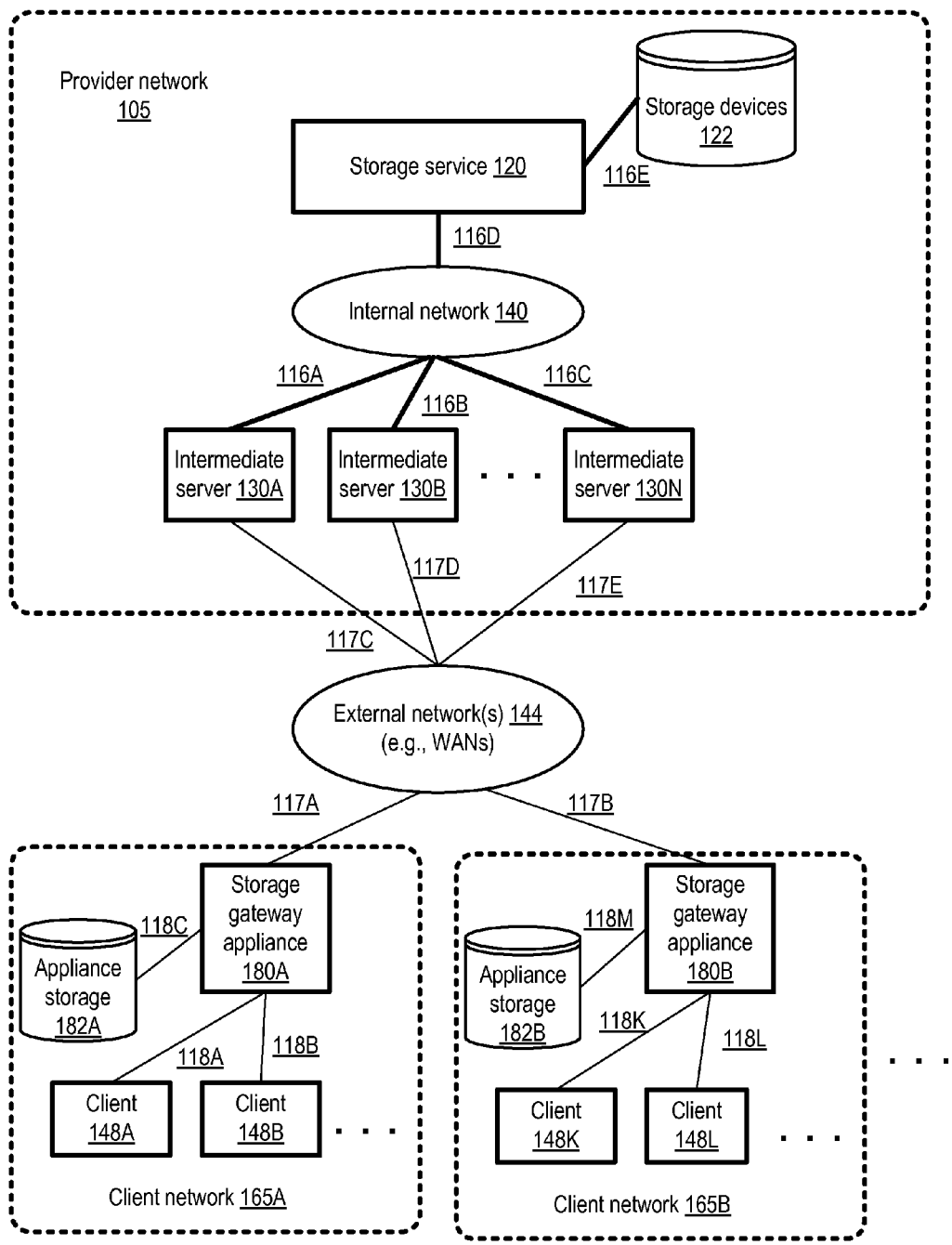
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing cached volumes at storage gateway appliances are described. The term "volume" may be used herein to refer to an identifiable unit of data storage. A volume may, for example, be mounted at a computer server, using an operating system interface, to enable users of the computer server to access the data stored in the volume as though the data were present on the local storage devices of the server. A "cached volume" may be used herein to refer to a volume for which a client of a network-accessible storage service has designated space as a cache at one or more client-side storage devices, while a primary instance or version of the volume is maintained at the network-accessible storage service. The cache space, which may be distributed among a plurality of storage devices such as individual disks, disk arrays, flash memory devices, or the like, may be managed by a storage gateway appliance in some embodiments. A storage gateway appliance may be implemented as a virtual or physical appliance that is installed on-premise at a customer's data center and that acts as a gateway for storage-related traffic between the customer's data center and the network-accessible storage service—e.g., as an entity that initiates network traffic to the storage service, and receives network traffic from the storage service, on behalf of the client, as needed. In the following description, the terms "storage gateway", "storage gateway appliance" and "storage appliance" may be used synonymously, and actions described as being performed by a storage gateway appliance may refer to actions performed by a subcomponent of the appliance, or by a process executing at the appliance.

At least for some types of applications, a very large amount of data may be generated over time in a volume being used for the application, and only a subset of the data may represent a "working set" that is accessed relatively frequently. By caching a subset of the volume's data locally on client premises, the storage gateway appliance may provide faster access to the working set than if all the accesses to the volume required communication with the remote storage service. In at least some embodiments, the specific set of storage devices (such as commodity disks) to be used for caching may be specified by a client during cache setup or initial configuration, enabling client control over storage hardware costs. Clients may send cache configuration requests for initial cache setup, or for subsequent cache expansion or contraction, with the requests specifying the storage devices to be commissioned for the cache (or decommissioned from the cache). The storage gateway appliance may respond to such cache configuration requests by performing the necessary configuration steps to include the specified devices in a cache storage pool (or exclude the specified devices from the cache storage pool). Such caching may be particularly effective at enhancing overall input/output performance in embodiments where traffic between the client premises and the remote storage service has to flow over links of a shared Wide Area Network (WAN), such as various links of the public Internet, which may have lower network bandwidth, higher latencies, and/or greater unpredictability with respect to performance than high-speed private or dedicated networks. It is noted that although much of the following description refers to disks as the storage devices being used for caching data and for other related operations (such as storing upload buffer entries as described below), other types of storage devices may be used in various embodiments.

In at least some embodiments, the storage gateway appliance may support other services in addition to core caching functionality. For example, the appliance may support snapshot functionality in some embodiments, enabling clients to store point-in-time versions of portions or all of a volume's data at the remote storage service. Such snapshot functionality may be supported using upload buffers employing disk storage specifically designated for snapshots (as opposed to caching) in some embodiments, as described below in further detail. Such upload buffers may also be referred to as "write logs" or "snapshot storage" herein. In some embodiments, a storage gateway appliance may also serve as a storage protocol translator—e.g., a client may wish to use a storage protocol S1 that differs from the storage protocol natively S2 supported by the storage service, and the storage gateway may act as an intermediary, translating between S1 and S2 as needed. In some implementations, a client may provide an arbitrary collection of disks, potentially obtained from a variety of different disk vendors, for use by the storage gateway as cache disks and/or upload buffers; in other implementations, a storage gateway appliance may be pre-equipped with certain types of disks, and/or restrictions may apply on the types of disks that the appliance can support.

The size units in which data is organized at the remote storage service, and transmitted over network connections to/from the remote storage service, e.g., for caching, may differ from the sizes of typical I/O operations requested by client applications in at least some scenarios. For example, in one embodiment, a given volume, which may potentially comprise terabytes or petabytes of data, may be organized as a plurality of "data chunks", with the size of each data chunk set to a maximum of a small number of megabytes (such as four megabytes). Each data chunk may further be subdivided, e.g., for the purposes of efficient cache metadata management as described below in further detail, into smaller units called data blocks (such as 64-kilobyte data blocks). Cache disk space may be allocated in units of data chunks in some embodiments. Of course, a given client read or write request may be targeted to any desired amount of data, which may map to a subset of a given data block, to an entire data block, to multiple data blocks of a given data chunk, or to data blocks of more than one chunk. The sizes of data chunks and/or data blocks may be tunable in some embodiments, either globally (e.g., a consistent chunk size and block size may be used for all the cached volumes managed by a storage gateway) or for individual volumes. A number of different tradeoffs may be taken into account when determining chunk sizes and block sizes in different embodiments, such as the amount of metadata required for cache management for a given (chunk size, block size) combination, the number of I/O operations needed for different types of client I/O requests, the distribution of client I/O request sizes, the network overhead of transmitting chunks versus blocks, the processing overhead for such tasks as checksum operations, compression and the like. In at least some embodiments, the storage gateway may be designed and implemented with a specific set of performance and other requirements or goals in view, including responsiveness and throughput requirements, requirements to minimize the overhead of metadata-related I/O operations, requirements not to lose client updates that have been acknowledged (even in the event of a failure), and so on, any combination of which may play a role in the determination of the chunk and block sizes.

A storage gateway appliance may, in at least some embodiments, store logically equivalent caching metadata in multiple storage device locations, e.g., to help speed up appliance restarts and to meet various performance and availability goals. The metadata, which may be used, for example, for identifying the offsets and/or states of various chunks and blocks of a cached volume on a cache disk, may comprise a number of different elements in different embodiments, as described below in further detail with respect to FIG. 5. According to one embodiment, a first storage space on a given cache disk or other cache storage device may be designated to (a) cache at least a portion of one or more data chunks of a volume and (b) store inline metadata for the data blocks of the one or more data chunks. The inline metadata may be stored in metadata sections that are interspersed among, or that alternate with, data blocks of the data chunk in the first storage space in some embodiments—e.g., in one implementation, a given data block may be located between two inline metadata sections, and a given inline metadata section may be located between two data blocks. A second storage space on that given cache storage device may be designated for storing contiguous metadata for the one more data chunks. At least a portion of the contiguous metadata for a given data chunk may be based on a portion of the inline metadata for the data blocks of the data chunk—e.g., some or all of the contiguous metadata may be logically derived from (or be a replica of) portions of the inline metadata. In response to at least some types of cache misses resulting from a client I/O request directed at a particular block of the chunk (e.g., an initial cache miss associated with the particular block), one or more inline metadata sections may be modified. The modifications may, for example in the case of a client read request, indicate that the particular block has been retrieved from the remote storage service and stored in the cache, or in the case of a write request, indicate that the block contains data modified or written by the client. The inline metadata may, in some implementations, be modified prior to providing a response to the client's I/O request. The contiguous metadata corresponding to the data chunk or block may not be modified immediately; instead, it may be modified asynchronously with respect to the modification of the inline metadata. Thus, the contiguous metadata may lag behind the inline metadata in terms of how current the metadata elements or contents are, at least at some points in time. The contiguous metadata may eventually be brought up to date in any of a number of ways in different embodiments—e.g., by periodically synchronizing it with inline metadata during normal operation, by synchronizing it with the inline metadata during controlled shutdown of the appliance or cache storage device, during cache eviction operations as described below in further detail, or during recovery after an unexpected shutdown or failure, as also described below in further detail.

In order to perform such caching-related operations as determining whether a data block for which a client read request is received is present in the cache or not, one or more processes of the storage gateway appliance may need to examine the cache metadata for the volume, preferably from an in-memory version of the metadata. Because of the manner in which inline metadata corresponding to the chunks of a given cached volume may be distributed across a given cache storage device in some embodiments, a substantial amount of time may be required to read all the inline metadata for a given set of chunks into memory (e.g., due to disk seeks required to access each of the inline metadata sections). In contrast, it may be much faster to read the chunk metadata from the contiguous metadata section of the disk, which may be accomplished using large sequential reads that may often be more efficient than random reads. Thus, rapid retrieval of the metadata from the contiguous metadata section into the appliance's memory may be enabled. For example, after a controlled shutdown (during which the contiguous metadata is made current using the inline metadata) and a corresponding restart, the appliance may only have to read the contiguous metadata into memory before enabling client access to the cached volume. In at least some embodiments, the sizes of the inline metadata sections and the contiguous metadata section may be selected in such a way that all the metadata for all the cached data chunks of a given volume can fit in the storage gateway appliance memory. As a result of such an arrangement, the majority of metadata manipulations performed during normal operations may be in-memory operations instead of on-disk operations, and the disk I/O operation overhead for cache management operations (e.g., metadata reads and writes) may be kept low.

According to one embodiment, when a client submits a write request (e.g., either a write to a new data block of a data chunk, or a modification of an existing data block), the storage gateway appliance may modify a corresponding portion of the disk cache and associated inline metadata, and also add an entry to an upload buffer. The upload buffer, which may be maintained in a separate disk storage space than the cached chunks and their associated cache metadata, may be used for asynchronous uploads of the modified data to the remote storage service in such an embodiment. In such an embodiment, the upload buffer may serve as a temporary holding area or a staging area for updates to the volume, and before the data block(s) containing a given set of modifications is evicted or removed from the appliance's cache disks, the appliance may have to verify that the corresponding upload buffer entry or entries have been uploaded to the remote storage service. The relative timing of the addition of the upload buffer entry, with respect to the timing of the modifications to the cache disk block, and/or the response to the client that requested the write, may vary in different embodiments. In one embodiment, for example, an upload buffer entry may be written first, then the cache disk inline metadata and data block may be modified, and then the response may be sent to the client; while in another embodiment, a response may be sent to the client as soon as the inline metadata and data have been written, with the upload buffer entry being written asynchronously. The upload buffer may be implemented as an append-only data structure in some embodiments. In various embodiments, point-in-time snapshots of a volume (or sub-portions of the volume) may be generated, e.g., at client request, using the upload buffer, and stored at the remote storage service. In such embodiments, the upload buffer may be referred to as "snapshot storage". It is noted that at least in some embodiments, client-initiated data modifications may be transmitted to the storage service from the gateway without using upload buffers.

In some embodiments, the storage gateway appliance may have to merge data from the remote storage service with data modifications generated by a client. For example, consider the following sequence of I/O operations directed to a particular 64 KB (kilobyte) block that is initially not present in the appliance's cache. First, a write request directed to 4 KB of data at offset 16 KB within the block is received. In response to the write request, the storage gateway appliance may store the modified data (and corresponding inline metadata) in cache storage allocated for the data chunk to which the block belongs, without downloading any data from remote storage. In some embodiments, as described below in further detail, the appliance may fill other parts of the block (e.g., portions or all of the 60 KB that are not modified by the client) in the cache disk with a special "invalid data" pattern or token, because the corresponding valid data has not been retrieved from the remote storage service. After the write request, a read request for 4 KB at offset 32 KB within the block is received. In response to the read request, the appliance may initiate a download of the 64 KB block. The appliance may then determine that a merge of the downloaded data block contents with the modified 4 KB section (which is now present in the cache) is required, and merge the modified block with the remainder of the downloaded block. Thus, the portion of the cache disk allocated for the block may contain the results of the merge operation: the 4 KB written by the client, and 60 KB read from the remote storage service. In embodiments where "invalid data" patterns are used, they may be overwritten when the valid data is written to the disk cache. The 4 KB of read data requested by the client may be extracted from the downloaded block in memory (or from the merged block on disk) and provided to the client. Details of the operations that may be performed in response to client-requested reads and writes in various embodiments are provided below, in conjunction with the descriptions of FIG. 7, FIG. 8 and FIG. 9.

The storage gateway appliance may be configured to implement a proactive cache eviction technique in at least some embodiments. Unlike some types of cache implementations, in which cached data is not removed/replaced from the cache until the cache gets full, a process of the storage gateway appliance may attempt to ensure that sufficient free cache disk space is maintained as part of normal operation, so that long delays are not encountered (or are very rarely encountered) due to the cache becoming full. Recall that at least in some embodiments, cached data blocks that contain modified data may not be replaced in the cache until the corresponding upload buffer entries have been uploaded to the remote storage service. As a result, depending on various factors such as the relative numbers of client reads and writes, the speed with which upload buffer entries are uploaded, network congestion, appliance processor load, and so on, it may not be advisable to wait to evict cached data chunks until a very large fraction of the cache is in a dirty state (i.e., such that the corresponding data modifications have not been uploaded to the remote storage service). The gateway process or subcomponent responsible for proactive eviction may be termed the "cache evictor", the "cache evictor process", or simply the "evictor" herein. In some embodiments, the evictor may be instantiated or executed as a background or low-priority process or activity, so as not to interfere with processing and I/O associated with the incoming stream of client-initiated I/O requests.

The evictor may be responsible for monitoring the number of free or unused data chunks in the cache disks in some embodiments (or the ratio of unused data chunks to the total cache disk space). When the number (or ratio) falls below a threshold, the evictor may start a proactive eviction iteration. As part of the iteration, the evictor may identify, using one or more criteria such as how recently the chunks were used, an eviction set that includes N data chunks of the cache that are to be freed. In some embodiments, the evictor may consider only clean data chunks (i.e., chunks that do not have any to-be-uploaded upload buffer entries outstanding) for inclusion in the eviction set. In at least some embodiments (e.g., where upload buffers are not used), chunk metadata elements such as state indicators may be used to determine whether a chunk is clean, and therefore suitable for eviction, or not. In other embodiments, the evictor may initiate or request uploads from the upload buffer to the storage service for dirty chunks identified as candidates for eviction, thus changing the state of the dirty chunks to clean, and then include them in the eviction set. For each of the N data chunks of the eviction set, the evictor may generate one or more metadata entries in memory, including, for example, a state indicator (such as an "Unknown" state indicator), and an instance identifier that may be used for data validity checking under certain conditions as described below in further detail. After the metadata for all N chunks has been determined, the evictor may write the metadata from memory to the contiguous metadata section of the cache disk (or disks) on which the eviction set chunks were located, e.g., using one or more efficient bulk write operations instead of potentially less-efficient separate writes for each chunk's metadata. The state indicator may be used to find candidate chunks when new chunks have to be allocated in response to client I/O requests. The proactive eviction technique described above may help to substantially reduce the number of physical I/Os that are needed when an incoming client request requires a new cache chunk, and the bulk writes may help reduce the overhead associated with cache eviction. A number of different criteria may be used in different embodiments when selecting a candidate chunk for inclusion in the eviction set—e.g., the recency of chunk use (how recently the chunk was last accessed) and/or frequency of chunk use (e.g., how often a chunk has been accessed) may be considered. In one embodiment, the relative or absolute location of a chunk within the cache storage device may also be a criterion for eviction—e.g., if two or more data chunks that are adjacent to one another on disk can be evicted together, this may facilitate larger and more efficient sequential writes than if two chunks that are not adjacent are evicted together, so a given chunk may be selected for eviction based on its location with respect to other eviction candidates.

According to some embodiments, the storage gateway appliance may be configured to implement rapid recovery after an unplanned shutdown or crash. As described above, the contents of the contiguous metadata sections of cache disks may lag slightly behind the inline metadata sections, so that at a given point in time, some fraction of the metadata in the contiguous section may be slightly out of date. However, in general, and depending on the synchronization techniques being used to refresh the contiguous metadata, the majority of the metadata in the contiguous section may typically be valid, with only a small portion lagging. When an unexpected shutdown occurs, and the storage gateway is restarted, it may rely on the validity of the majority of the contiguous to quickly allow client I/Os to resume, and also rely on eventually updating the out-of-date metadata in memory using inline metadata sections on an as-needed basis. For example, in one embodiment, upon restart, the contiguous metadata section (or sections) for a given cached volume may be read into memory. For each chunk that was present in the cache as indicated by the metadata read from the contiguous metadata section, a caching state metadata entry may be examined. A given chunk may be in any one of a number of different states, such as "Clean", "Dirty", or "Unknown" (chunk states and state transitions are described in further detail below with respect to FIG. 10). In some implementations, all the chunks may be placed in a "Needs-validation" state upon restart after a crash, indicating that when an I/O request is first directed to the chunk, the in-memory metadata for that chunk is to be validated using the on-disk inline metadata sections for that chunk. In other implementations, only a subset of the chunks may be placed in "Needs-validation" state (such as the subset that is not in "Unknown" state), while inline metadata may be read synchronously for another subset of the chunks (such as the subset that is in "Unknown" state) before allowing client I/Os to resume for that other subset.

By reading the contiguous metadata quickly (e.g., using large sequential reads) in some embodiments, and allowing client I/Os to resume despite the fact that some of the contiguous metadata may not be current, the duration of the disruption caused to client applications by the crash may be reduced substantially. Since much of the contiguous metadata is typically valid even after a crash, and since only the first I/O directed at a given chunk in "Needs-validation" state results in the reading of the inline metadata for the chunk in such embodiments, the performance costs of bringing the storage gateway appliance back into an active or running state after the crash may be kept low. In some embodiments, at least a portion of the upload buffer may be invalidated as a result of a crash, so that outstanding snapshots or uploads may have to be re-done. In such an embodiment, a "bootstrapping" operation may be initiated after a crash, during which contents of at least some subset of valid data blocks present in the cache are uploaded to the remote storage service. In some embodiments, bootstrapping may have to be completed before the storage gateway appliance is brought into active mode for new client I/O requests, while in other embodiments the bootstrapping may be done in parallel to new client I/O requests and/or run as a background or low-priority task.

As noted above, in at least some embodiments, connectivity between the storage gateway appliance and the remote storage service may be implemented using relatively low-performance network links, such as WAN links. In some such embodiments, intermediate devices or servers that are connected to the storage gateway appliance via the low-performance network links, but are connected to the storage service using high-performance network links, may be used to optimize some of the upload and download operations required for supporting cached volumes at the appliance. Such intermediate servers may be referred to as "data plane" servers or devices in some embodiments (since they may be used primarily for transferring client data, as opposed to, for example, "control plane" servers or devices that may be used primarily for configuration or administration purposes). Data plane servers may be located within the same provider network in which the storage service is implemented in at least some embodiments, and may thus be able to take advantage of high-speed dedicated internal network links for communications with the storage service.

According to at least some embodiments in which an intermediate server is used, in response to a detection of a read cache miss caused by a client-initiated read operation received at a storage gateway appliance, a first data transfer may be initiated from the remote storage service to the intermediate server over a first network path with a first bandwidth capacity (such as a path using high-speed links of the storage service provider's internal network). The first data transfer may result in the transmission of a data chunk (or a portion of a data chunk) that includes the data block (or blocks) to which the read operation was directed to the intermediate server. The intermediate server may determine, based on one or more criteria (such as results of an analysis of the pattern of I/O requests received at the storage gateway appliance, or metrics regarding resource utilization or network congestion), the number, contents, and/or relative priority of data transfers that are to be implemented from the intermediate server to the storage gateway appliance. These transfers from the intermediate server to the appliance, which may be resident at client premises, may occur over a different network path with a different bandwidth capacity (such as a WAN path, with a relatively low bandwidth and/or high latency). At least one such data transfer, comprising contents of a data block needed to respond to the read operation, may then be initiated from the intermediate server to the appliance. The data requested by the client may be provided from the storage gateway appliance.

The intermediate server may determine that additional data blocks of the chunk downloaded from the storage service should be transmitted to the storage gateway appliance, e.g., in anticipation of future read requests. In some embodiments, these pre-fetched data blocks may be transmitted at low priority to the storage gateway appliance, relative to the priority at which the data block that was originally requested by the client is transmitted. In one embodiment, the intermediate server may receive the data chunk in compressed format, uncompress the chunk, and extract the originally-requested data block before transmitting it on to the storage gateway. The extracted data block may be compressed before the transmission to the storage gateway appliance in some embodiments. The storage gateway appliance may merge modified contents of some of the data blocks that have been written to the disk cache, with contents sent by the intermediate server in some scenarios.

In some embodiments, the intermediate server may be configured to participate in the upload of client-modified data from the storage gateway appliance to the storage service. For example, when a data block of a particular chunk is updated at the storage gateway appliance cache, the modified contents of the block may eventually be transmitted to the intermediate server for further transmission to the storage service. The intermediate server may be configured to download the corresponding data chunk from the storage service in some embodiments, and merge the newly-updated data block with the remainder of the chunk, before transmitting the chunk back to the storage service. In at least some embodiments, the intermediate server may be responsible for validating the data received from the storage gateway appliance, the data received from the storage service, and/or the merged data, e.g., to reduce the likelihood that data is corrupted either inadvertently or maliciously. Details regarding various aspects of the functionality of the storage gateway and the intermediate servers are provided below.

Example System Environment

FIG. 1 illustrates an example system environment, according to at least some embodiments. The system comprises a provider network 105 in which a storage service 120 is implemented, as well as a collection of storage gateway appliances 180 and intermediate servers 130. The storage service 120 may be responsible for storing client storage objects (such as volumes, file systems, and the like) in storage devices 122, and providing access to the storage objects to clients 148 (e.g., clients 148A, 148B, 148K and 148L) via network connections. Each client 148 may have access to a collection of computing devices of a corresponding client network 165— e.g., clients 148A and 148B have access to client network 165A, and clients 148K and 148L have access to client network 165B in the depicted embodiment. Each client network 165, whose devices may be located in a corresponding client data center or set of data centers, may include one or more storage gateway appliances 180, such as storage gateway appliance 180A in client network 165A, and storage gateway appliance 180B in client network 165B. In the depicted embodiment, each storage gateway appliance 180 may be configured to cache subsets or all of the contents of client storage objects (whose primary copies are stored in storage devices 122 of the storage service 120) using respective appliance storage 182, e.g., appliance storage 182A of storage gateway appliance 180A and appliance storage 182B of storage gateway appliance 180B. Appliance storage 182 may include, for example, a plurality of disks and/or other storage devices, some of which may be used for caching data chunks and data blocks of client storage objects such as volumes, while other may be used for upload buffers (snapshot storage) or other purposes.

A storage gateway appliance 180 may be configured to download data from, and upload data to, the storage service 120 over a combination of network links in various embodiments. In the depicted embodiment, network links 117 (e.g., link 117A, 117B, 117C, 117D and 117E) may be used for communications between the storage gateway appliances 180 and a set of intermediate servers or devices 130 of the provider network. Links 117 may be part of an external network 144, which may include at least some relatively low-performance links such as WAN links. Within the provider network 105, intermediate servers or devices 130 may be able to utilize an internal network 140 to communicate with storage service 120, e.g., over high-performance dedicated network links 116

(e.g., links 116A, 116B, 116C or 116D). Similarly, high-speed links 116E may be used to store data to, or retrieve data from, the storage devices 122 of the storage service 120 in some implementations. A different set of links 118 (which may also support higher performance than the external network 144) may be used within the client networks 165, such as links 118A, 118B, 118C, 118K, 118L, and 118M.

In some embodiments, a client 148 may create a storage object, such as a cacheable storage volume, using one or more administrative interfaces (such as service consoles implemented via web sites or web pages) not shown explicitly in FIG. 1. For a given cacheable volume, a client 148 may indicate the size of the disk cache to be set up at the appliance storage 182 of its storage gateway appliance 180. For example, a volume of size 10000 Gigabytes (GB) may be created at storage service 120 by a client 148A (such as an administrator of a client network 165), and a disk cache with a maximum size of 1000 GB may be established at appliance storage 182A. In some embodiments, where a hierarchical organization of volumes into chunks and chunks into blocks is used, clients may be able to specify or select cache chunk sizes and/or data block sizes, while in other embodiments the storage service 120 and/or the storage gateway appliances 180 may be responsible for deciding chunk and block sizes. In at least some embodiments, the space within a storage gateway appliance's disk cache may be allocated in units of chunks, and data may be transferred, at least between the storage service 120 and the intermediate servers 130, in chunks. Each storage gateway appliance 180 may be configured to cache chunks of one or more cacheable volumes or other storage objects in some embodiments. The number of volumes whose data is cached by a given storage gateway appliance 180 may depend, for example, on the total sizes of the caches that the clients 148 wish to set up, and on the total amount of disk space available in corresponding appliance storage 182. In at least some scenarios, multiple storage gateway appliances 180 with respective appliance storages 182 may be established within a given client network 165. The multiple storage gateway appliances may be configured for redundancy, load balancing or fault-tolerance in some embodiments, and/or simply to cache larger volumes in other embodiments (e.g., the cache disk space requested for a single volume may be too large to fit on the disks allocated to a single storage gateway appliance 180, so more than one appliance may be used to cache the contents of that single volume).

A storage gateway appliance 180 may maintain caching metadata for one or more cacheable volumes (or portions of volumes) for which the gateway appliance is responsible. The metadata may be maintained in two types of on-disk locations of the appliance storage 182, as well as in a volatile memory of the storage gateway appliance 180 in some embodiments. In some embodiments, a portion of each cache disk's address space (e.g., near the starting address of the disk) may be set aside for contiguous caching metadata, while a different portion of the cache disk address space may be set aside for the volume's data blocks and inline metadata sections. The contents of the inline metadata sections may represent the most current on-disk metadata (except under certain exceptional or error operating conditions), and may under most operating conditions be replicated within the volatile memory of the storage gateway 180 in some embodiments. Thus, to look up whether a particular data block and/or its containing data chunk is present in the disk cache, the in-memory metadata may typically be consulted. When a new data block is downloaded from storage service 120 (e.g., in response to a read miss), an inline metadata section or sections for that data block may be updated, and the contents of the block stored on the cache disk, without necessarily updating contents of the contiguous metadata section of the disk. The contiguous metadata may be updated asynchronously in at least some embodiments, e.g., by copying at least a portion of the inline metadata during periodic synchronizations, during controlled shutdowns, or during eviction-related processing. After a controlled shutdown, when the storage gateway appliance 180 is brought back online, the contents of the contiguous metadata section may be quickly read into memory, and client I/O operations may be resumed as soon as all the metadata is read in some embodiments.

The data of the cacheable volume may be transformed in a number of different ways before storage to disk (e.g., at the appliance storage 182 and/or at the storage service 120) and/or before network transmission in some embodiments. In one embodiment, for example, data chunks and/or blocks may be compressed before transmission from storage service 120 to intermediate servers 130, before transmission from intermediate servers 130 to a storage gateway appliance 180, and/or before transmissions in the reverse direction between the storage gateway appliance 180 and an intermediate server 130, or between an intermediate server 130 and the storage service 120. In some embodiments, checksums may be computed for data blocks and/or for entire data chunks, and the checksum values may be transmitted as well, so that the validity of the data may be checked at either the storage gateway appliances 180, the intermediate servers 130, and/or the storage service 120. In at least one embodiment, additional operations may be performed on the data, e.g., using special transformation keys stored in the chunk or block metadata, before writing contents of a disk block to a cache disk, to enhance data security and reduce the chances of unauthorized data access. The intermediate servers 130 may be configured to initiate various types of pre-fetch operations, e.g., low-priority data transfers of data blocks that were not explicitly requested by clients, in some embodiments, as described below. In different embodiments, any of various techniques may be used to identify a particular intermediate server 130 to be used for a particular data transfer. For example, in some embodiments, a set of one or more intermediate servers 130 may be assigned for data transfers between a given storage gateway appliance 180 and the storage service 120, for all the cached volumes managed using that appliance. In other embodiments, a different intermediate server 130 may be selected for each data transfer, e.g., based on current workload levels at the intermediate servers and/or based on network conditions. It is noted that at least in some embodiments, storage gateway appliances 180 may communicate with the storage service 120 directly, without using intermediate servers 130.

Details regarding proactive or preemptive cache eviction techniques that may be implemented at a storage gateway appliance 180 to reduce the likelihood of long delays during normal read/write operations are provided below. In additional, techniques to speed up storage gateway appliance recovery times after crashes, taking advantage of the ability to quickly read contiguous metadata sections of appliance storage devices (e.g., using large sequential reads or read-ahead), are also described below in further detail.

Example Components of Storage Gateway Appliances

Figure 2:
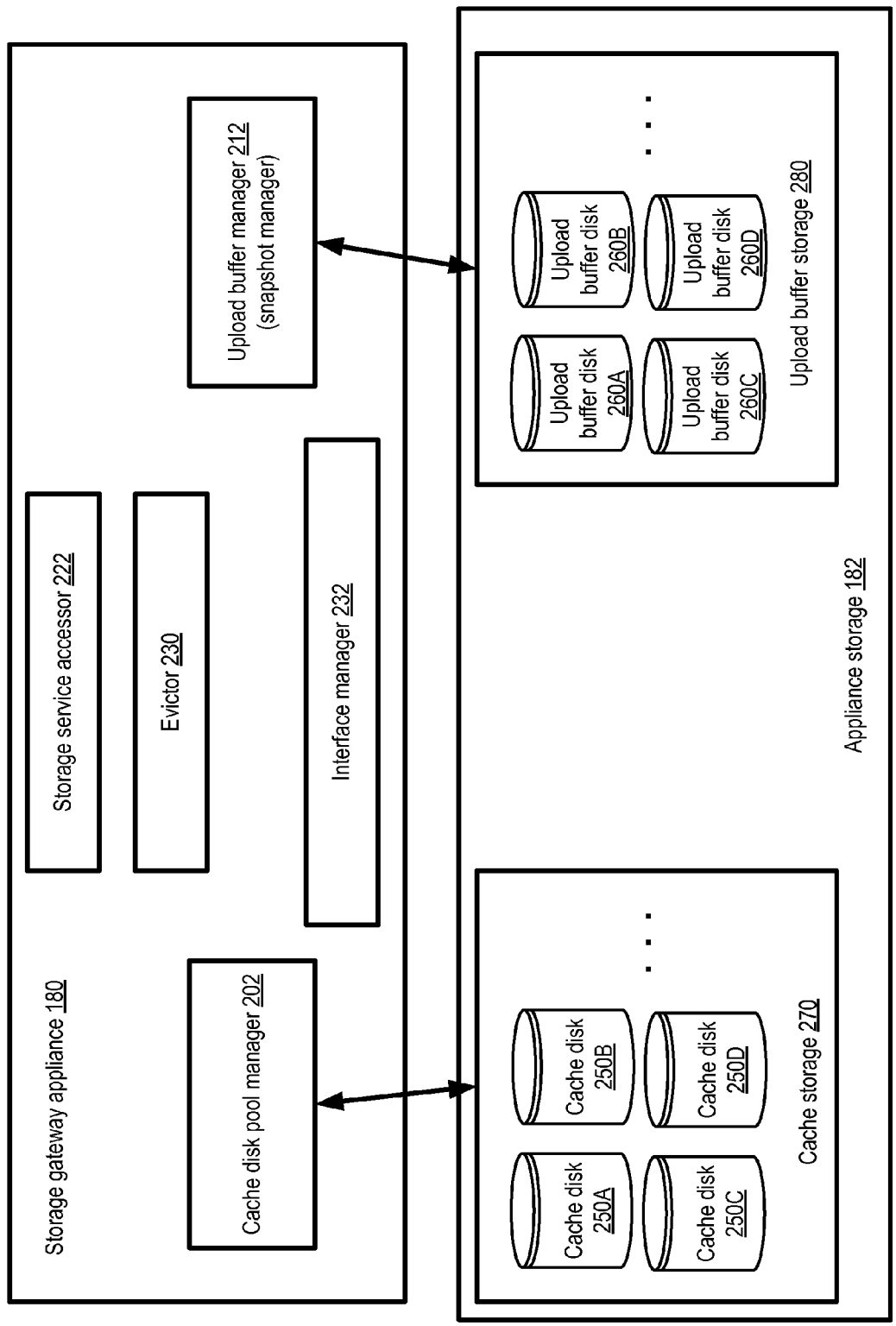
FIG. 2 illustrates example subcomponents or processes of a storage gateway appliance, according to at least some embodiments.

FIG. 2 illustrates example subcomponents or processes of a storage gateway appliance 180, according to at least some embodiments. As shown, the storage gateway appliance 180 may include a cache disk pool manager 202, an upload buffer manager 212, an interface manager 232, an evictor 230 and a storage service accessor 222. Each component 202, 212, 232, 230 and 222 may be implemented using any desired combination of hardware and/or software elements in various embodiments. Storage service accessor 222 may be responsible for data transfers and/or administrative communications with storage service 120, e.g., either directly or via intermediate servers 130. Cache disk pool manager 202 may be responsible for managing cache storage 270 of the appliance storage 182, which may include a plurality of cache disks 250 (e.g., disks 250A, 250B, 250C and 250D). For example, cache disk pool manager 202 may identify the sections of disk space that are to be used for contiguous metadata, disk blocks and inline metadata, updating on-disk data blocks and metadata as needed, and handling disk reads and writes for client I/O requests. In some embodiments, storage devices other than traditional disk drives may be used for the cache, e.g., flash memory drives or other devices may be used to store the cache metadata and/or the data blocks of various chunks in some environments.

Upload buffer manager 212, which may also be referred to as a snapshot manager, may be responsible for logging-related operations and/or snapshot operations at upload buffer storage 280. A plurality of upload buffer disks 260 may be used in some embodiments, such as disks 260A-260D. Upload buffer manager 212 may schedule uploads of entries written to the upload buffer disks 260 (or to other types of storage devices than disks, such as flash memory devices usable for the upload buffer) as a result of client-initiated write operations directed to cached data at disks 250. Upload buffer manager 212 may also, for example, schedule the upload of a point-in-time snapshot of a volume or a portion of a volume to the storage service 120 via the storage service accessor 222, or schedule retrieval of a point-in-time snapshot from the storage service 120 at client request. When uploading a snapshot, the upload buffer manager 212 may be responsible for identifying the appropriate set of entries that correspond to the specified point-in-time for the snapshot. In at least some embodiments, disk space on the upload buffer disks 260 may be organized as append-only logs. The upload buffer may temporarily store data modifications corresponding to dirty cached data blocks, before they are uploaded to the storage service; after all the pending or buffered modifications of a particular data chunk have been uploaded, the chunk state may be changed from "Dirty" to "Clean" in some embodiments.

Evictor 230 may be responsible for ensuring that a pool of free (i.e., currently unallocated) cache chunks is available to be used for incoming read/write requests from clients, at least under normal operating conditions. For example, evictor 230 may track the number of free chunks available in the cache disk space allocated for a particular cached volume, and if that number falls below a threshold, initiate an eviction cycle or iteration. During the eviction cycle, a number of chunks may be evicted from the cache proactively, thus avoiding potential delays that might have resulted if the number of free chunks was allowed to fall further and a burst of client I/O requests occurred. Evictor 230 may write updated metadata to contiguous metadata sections of various cache disks 250 during eviction cycles, as described below. In some embodiments, evictor 230 may be implemented as a subcomponent of cache disk pool manager 202. In at least one embodiment, the operations of evictor 230 may be conducted at a lower priority than some other operations of storage gateway appliance 180 (such as operations associated with incoming I/O request handling or with transfers from upload buffers to the storage service), e.g., evictor 230 may be instantiated as a background process or a background task.

Interface manager 232 may be responsible for implementing programmatic interfaces (such as application programming interfaces (APIs)) that may be used by clients 148 to request operations such as I/Os, snapshot reads and writes. In some embodiments, interface manager 232 may support a plurality of storage protocols or interfaces, some of which may differ from the native storage protocols or interfaces used at storage service 120. For example, in at least some embodiments, the storage service 120 may store the client's data in the remote storage devices 122 according to block storage technology. In one embodiment, the storage service may store client data as objects retrievable via client-assigned keys. The interface manager 232 of the storage gateway 180 may expose any of a variety of protocols in different embodiments, such as block storage protocols (e.g., iSCSI, GNBD (Global Network Block Device), etc.), file storage protocols (e.g., NFS (Network File Storage), CIFS (Common Internet File System), etc.), and/or object storage protocols (e.g., REST (Representational State Transfer)) to the client's applications.

In at least some embodiments, a storage gateway appliance 180 may include other components or processes not shown in FIG. 2. For example, in some embodiments, multiple storage gateway appliances may be configured as a logical group, and a given storage gateway appliance 180 may include components responsible for group membership management and/or communications with peer storage gateway appliances. In some embodiments, some of the components illustrated in FIG. 2 may be omitted from a particular implementation of a storage gateway appliance 180.

On-Disk Metadata Layout

Figure 3:
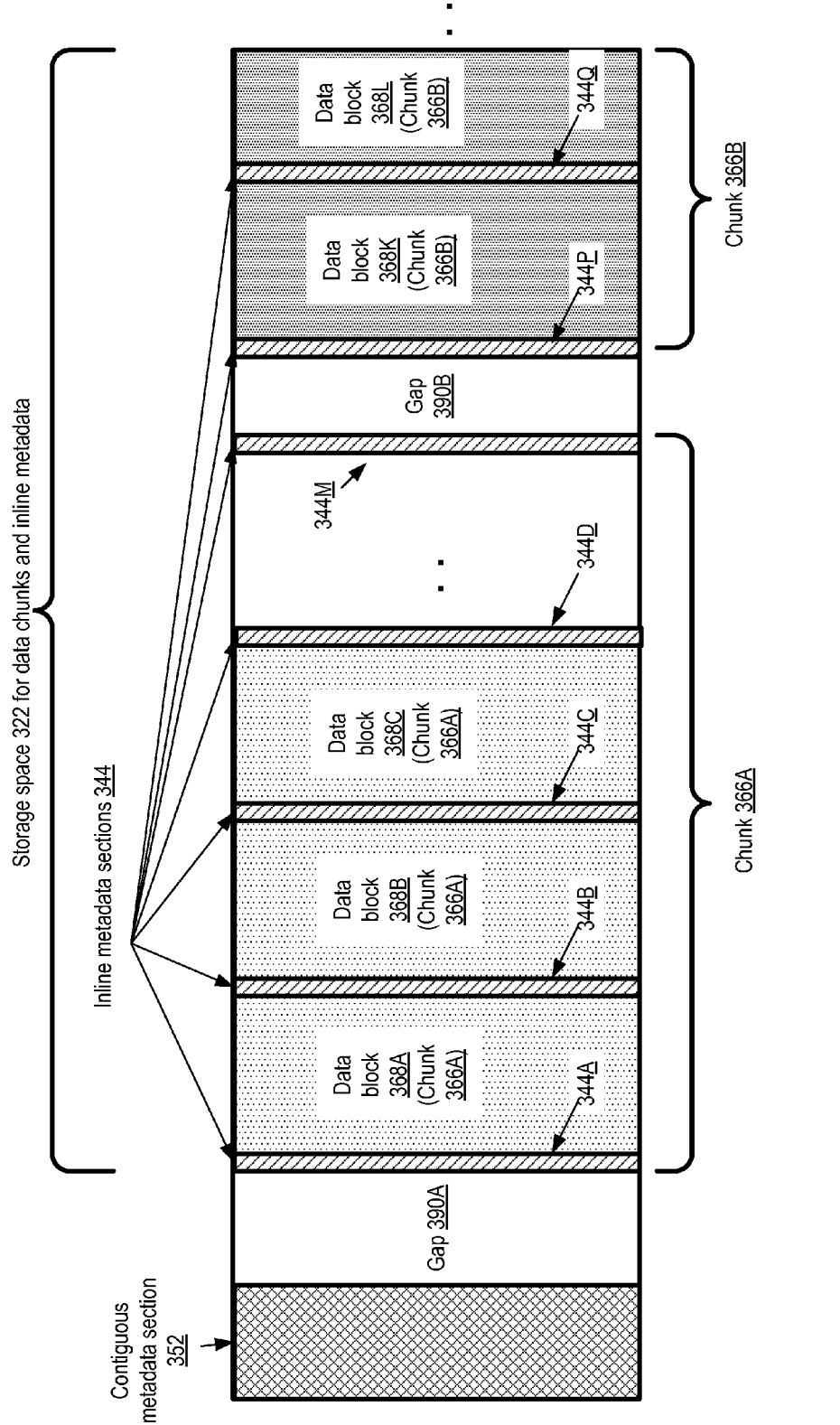
FIG. 3 illustrates an example of a layout of caching metadata on a given cache disk of a storage gateway appliance, according to at least some embodiments.

FIG. 3 illustrates an example of a layout of caching metadata on a given cache disk 250 of a storage gateway appliance 180, according to at least some embodiments. The disk addresses 302 (e.g., offsets from the start of the portion of the disk available for application use) are shown increasing from left to right in FIG. 3. As shown, a section 352 of the disk space (close to the start of the address space in the depicted embodiment) may be designated for contiguous metadata. Another space 322 of the disk may be designated to hold the data blocks of cached chunks, as well as inline metadata sections. In at least some implementations, more than one disk region may be used for contiguous metadata—e.g., contiguous metadata may be divided between two or more regions of the disk address space, or replicated across two or more regions of the disk address space.

Within space 322, respective ranges of disk space may be set aside for each cached chunk, such as chunk 366A and 366B. Within a given chunk, the data blocks 368 may be arranged alternately with inline metadata sections 344. For example, for chunk 366A, three data blocks are shown —366A, 366B and 366C. Each data block 368 is located between two inline metadata sections 344—for example, block 368A is located between inline metadata sections 344A and 344B, block 368B is located between inline metadata sections 344B and 344C, and so on. Similarly, data block 368K of data chunk 366B is located between inline metadata sections 344P and 344Q. In at least some embodiments, metadata entries for a particular data block 368 may be stored in both inline metadata sections that are adjacent to the particular data block. For example, for block 368C, metadata may be stored in inline metadata section 344C and also in inline metadata section 344D. The inline metadata section immediately preceding a given data block may be referred to as a "header" or "head" inline metadata section for that block, and the inline metadata section immediately succeeding the block may be referred to as a "tail" inline metadata section. In some implementations, different metadata elements for a given data block 368 may be written to the head and tail inline metadata sections, while in other implementations, identical metadata may be stored in both the head and the tail sections. In at least one implementation, when an I/O request is received that results in a write to a given data block 368 (e.g., when a client submits a write request directed to a portion or all of a data block 368), both the head and tail inline metadata sections may be updated prior to updating the data block contents, and a response to the client request may not be sent until both inline metadata sections have been updated.

In at least some embodiments, when only a portion of a particular data block 368 is written to, the remainder of the data block may be initialized with an "invalid data" pattern. For example, if each data block 368 is 64 KB in size, and a client writes to the first 4 KB of a particular block, in such an embodiment an invalid data pattern may be written in the remaining 60 KB of the block. In response to a subsequent read request directed at the same data block, the validity of the data block in the cache may be checked by determining whether the invalid data pattern is found in the block. If the invalid data pattern is found, a download of the data block from the storage service 120 may be initiated to respond to the read request, and the downloaded data may be merged with the 4 KB portion that was previously written.

The sizes of the contiguous metadata section 352 and/or space 322 may be determined by the storage gateway appliance 180 (e.g., by its cache disk pool manager 202) in some embodiments, based for example on client cache configuration requests, chunk size and/or data block size. In some embodiments, gaps such as 390A and 390B may initially be left between the contiguous metadata section and the chunks 366, or between successive chunks 366. The gaps may be useful if, for example, the contiguous metadata section grows beyond its initial size, or if metadata or data has to be moved from one location to another on disk. In addition, gaps such as 390A or 390B may be left for alignment-based performance reasons in at least some embodiments. For example, depending on the specific disk hardware being used in a given implementation, optimal disk I/O performance may be obtained if the data written to disk is aligned based on 4-kilobyte multiples for one disk type or vendor, while optimal disk I/O performance may be obtained for a different disk type or vendor if data is aligned based on 512-byte multiples, and gaps may be left between the chunks and/or various metadata sections to support the optimal level of performance. In other embodiments, gaps 390 may not be used. In some embodiments, the sizes of the data chunks 366, the data blocks 368, and/or the inline metadata sections 344 may be the same for different cached volumes (e.g., in one implementation, each chunk may comprise 64 data blocks, each block 64 KB in size, and each inline metadata section may be 4 KB in size; thus, the total disk space needed for the data blocks and inline metadata sections of the chunk may be (64×64 KB)+(65×4 KB), assuming that each chunk starts and ends with an inline metadata section 344). When inline metadata for a given data block 368 is to be updated or initialized, the offset or location of the inline metadata section may be determined based on the relative offset of the data block 368 within the chunk—e.g., in the example shown in FIG. 3, the offset of the third inline metadata section 344C from the starting disk address of the chunk may be computed as (2×((data block size)+(inline metadata section size))), and in general the offset of the head inline metadata section for the Nth data block may be computed as ((N−1)×((data block size)+(inline metadata section size))).

In other embodiments, the sizes of data chunks, data blocks and/or inline metadata sections may vary from volume to volume or from storage gateway appliance to storage gateway appliance. In some embodiments, heuristics based on performance metrics obtained from tools such as network monitors, storage monitors or processing monitors may be used to select or modify block sizes, chunk sizes, and/or inline metadata section sizes.

Figure 4:
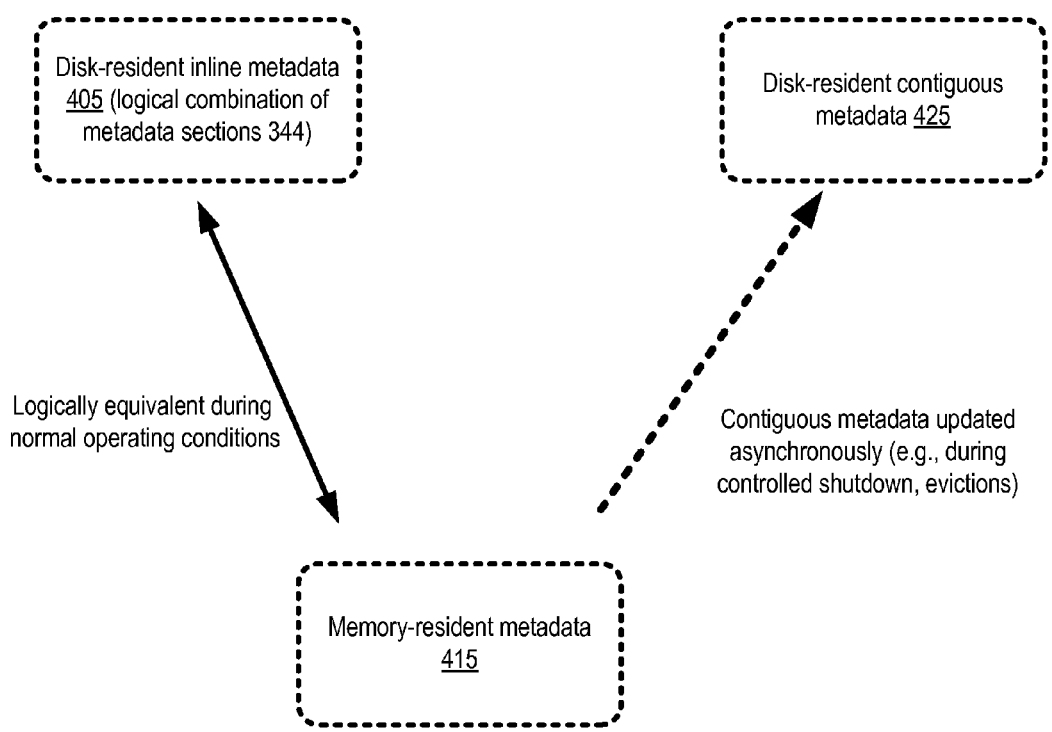
FIG. 4 illustrates an example of relationships between in-memory and on-disk caching metadata, according to at least some embodiments.

FIG. 4 illustrates an example of relationships between in-memory and on-disk caching metadata, according to at least some embodiments. At a given point in time during normal operation, the disk-resident inline metadata 405 comprising the logical combination of all the inline metadata sections 344 may represent the most recent on-disk metadata in the depicted embodiment. The in-memory metadata 415 closely tracks the inline metadata (e.g., because writes to the inline metadata are written from the memory of the storage gateway appliance, and inline metadata contents are read into the memory from the inline metadata sections as and when needed). In contrast, the contiguous metadata 425 stored in section 352 of FIG. 3 may be updated asynchronously in the depicted embodiment, e.g., during controlled shutdown, evictions, or in accordance with a synchronization schedule. In implementations where metadata layouts similar to that shown in FIG. 3 are used, updating inline metadata section(s) for a given data block may incur relatively low overhead when the data block itself is being updated (in fact, at least in some embodiments a single disk write may be sufficient to update the inline metadata as well as the data block). In contrast, if the contiguous metadata section were also to be updated whenever a new data block were written to the cache, the I/O overhead may be substantially higher. When metadata for complete chunks has to be read, as for example during restarts, it may be much more efficient to read the metadata from the contiguous metadata section 352, as only a few large sequential reads may suffice instead of the more numerous reads that may be required to read all the inline metadata sections. Thus, at least in some embodiments, the storage gateway appliance 180 may be optimized for (a) relatively infrequent bulk metadata reads from the contiguous metadata sections on disk and (b) updates only to inline metadata sections when data blocks are initially written to the cache. In some embodiments, after a particular data block's inline metadata section(s) have been updated, additional client I/O operations directed to the same block may not require any on-disk metadata updates (unless the state of the chunk to which the block belongs changes from "Dirty" to "Clean" or vice-versa, as described below with reference to FIG. 10, or until the next eviction iteration or shutdown occurs).

Metadata Contents

Figure 5:
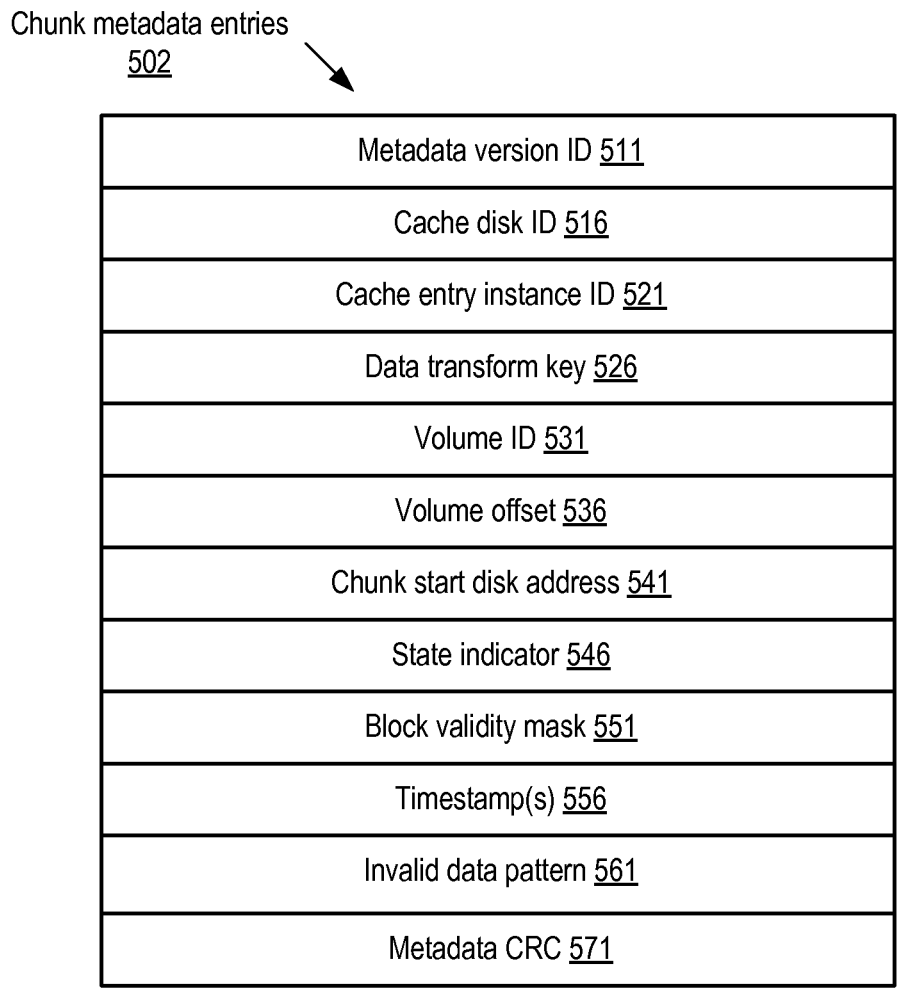
FIG. 5 illustrates examples of metadata elements for a data chunk of a cached volume, according to at least some embodiments.

FIG. 5 illustrates example metadata elements corresponding to a data chunk of a cached volume, according to at least some embodiments. In one embodiment, for each data chunk for which cache storage is currently allocated on a given cache disk 250, a corresponding set of metadata elements as shown in FIG. 5 may be stored in the contiguous metadata section 352 of the disk 250. Metadata for one chunk may be stored adjacent to the metadata for another chunk, so that it may be possible to quickly read all the metadata for all the chunks. In some embodiments, at least a subset of the metadata elements illustrated in FIG. 5 for a given chunk may also be stored in inline metadata sections 344; that is, at least some metadata elements may be replicated between the inline metadata sections and the contiguous metadata section. Metadata for a given chunk may thus be obtainable from two on-disk sources: a logical combination of the inline metadata sections for the data blocks of the chunk, and the contiguous metadata section. As described above, the version of metadata stored in the contiguous section 352 at a given time may be slightly out of date with respect to the inline metadata.

As shown, the metadata entries 502 for a given chunk may include a metadata version identifier 511. Software and/or hardware upgrades at the storage gateway appliance 180, intermediate servers 130 and/or the storage service 120 may result in upgrades to the metadata design or implementation over time in some embodiments, and for certain types of operations it may be useful to validate the metadata version using a version identifier 511. A cache disk identifier 516 may indicate the particular cache disk 250 on which disk space for the chunk has been allocated.

A cache entry instance identifier 521 (which may also be referred to herein simply as an "instance identifier") may be used for validating contents of data blocks in some embodiments. The cache entry instance identifier may be needed at least in part because of the way that evictor 230 operates in such embodiments. Cache entry instance identifiers may be stored in the contiguous metadata for a chunk, and also replicated in the inline metadata sections of the data blocks of the chunk in some implementations. Evictor 230 may free the disk space allocated for a given chunk without updating all the inline metadata sections of the chunk in some embodiments; instead, for example for performance reasons, the evictor may only update the contiguous metadata for the evicted set of chunks during a given eviction cycle or iteration. After the chunk has been evicted, client-initiated reads and writes may be resumed to the chunk, and the inline metadata may be updated based on the reads and writes performed. At a given time after an eviction, some data blocks of the chunk may contain fresh data written after the eviction, while other data blocks may still retain data that was written before the chunk was freed by the evictor 320. The data that remains from the previous use of the chunk (i.e., contents of data blocks that were written before the most recent eviction of the chunk) may thus be invalid. In order to quickly distinguish between such invalid data blocks and the valid data blocks written after the most recent eviction of the chunk, especially in the event of a crash, a new cache entry instance identifier 521 may be generated each time the chunk gets evicted in some embodiments. After a crash, as described in more detail below, the instance identifier stored in the inline metadata section(s) for a given data block B of a recently-evicted chunk (as determined by the "Unknown" state of the parent chunk C to which block B apparently belongs) may be compared to the instance identifier in the contiguous metadata section of chunk C. If the two instance identifiers match, the inline metadata and the data block B may be deemed valid. If the two instance identifiers do not match, the data block B may be deemed invalid, because the instance identifier mismatch indicates that the block comprises data written to the cache disk prior to the most recent eviction of the chunk. In some implementations, valid data for block B may be downloaded from the storage service 120 when the instance identifiers do not match.

In some embodiments, for example to further decrease the probability of inadvertently providing a stale or invalid data block to a client 148 that may not be authorized to see the stale data, a data transform key 526 may be used to encrypt the data blocks on the cache disk. Each time a chunk is freed by evictor 230, a new data transform key 526 may be generated, which may be subsequently used to encrypt/decrypt the data blocks of the chunk. Thus, when providing data from a block B of chunk C in response to a read request from a particular client 148, the latest data transform key may be used for decryption. If some stale data from previous use of the data block (i.e., prior to the most recent eviction) remains resident and is inadvertently made available to the client, the use of the new data transform key may render the data unintelligible.

The metadata 502 may include a volume identifier 531 and a volume offset 536, indicating the particular cached volume to which the chunk belongs and the offset of the start of the chunk within the volume. For example, a particular cached volume comprising 4-megabyte chunks may have a volume identifier VOL-ABCD, the first chunk of that volume may have its volume offset 536 set to 0, the second chunk may have its offset set to 4194304 (if offsets are expressed in bytes), and so on. The chunk disk start address 541 may indicate the offset within the cache disk's address space at which space for the chunk is allocated.

Depending on the implementation, a chunk may pass through a number of different caching states, such as an "Unknown" state immediately after eviction or allocation, a "Dirty state" while modifications of the chunk have not been uploaded to the remote storage service 120, and a "Clean" state after all the pending modifications have been uploaded. The current caching state of the chunk may be stored in state indicator 546 in some embodiments. A block validity mask 551 may be used to indicate which data blocks of the chunk have been initialized, and which remain uninitialized, in some embodiments. A data block may be initialized the first time it is written to in such embodiments, either due to a client-initiated write, or due to the storage gateway writing data downloaded from the remote storage service 120 in response to a read miss. A bitmap may be used for block validity mark 551 in some implementations: for example, in an implementation where each chunk comprises 64 blocks, a 64-bit mask may be used to represent the initialization state of 64 data blocks, with a "1" in the $n^{th}$ position indicating that the $n^{th}$ block has been initialized, and a "0" indicating that the $n^{th}$ block has not yet been initialized.

In some embodiments, one or more timestamps 556 may also be included in the chunk metadata, indicating for example the last time the chunk was freed by evictor 230, or the last time the chunk metadata was written to the contiguous metadata section. In some implementations, an invalidity indicator such as invalid data pattern 561 may be used as a filler to indicate portions of a data block that do not contain valid data—for example, if only 4 KB of a 64 KB block have been written to, the remaining 60K may be filled with the invalid data pattern 561. In some embodiments a cyclic redundancy check (CRC) value 571 or a similar error detection code for the metadata may be computed each time any of the fields is updated, and the error detection code may be stored with the metadata. In different embodiments, some of the metadata entries shown in FIG. 5 may be omitted, or others may be added or substituted.

Figure 6:
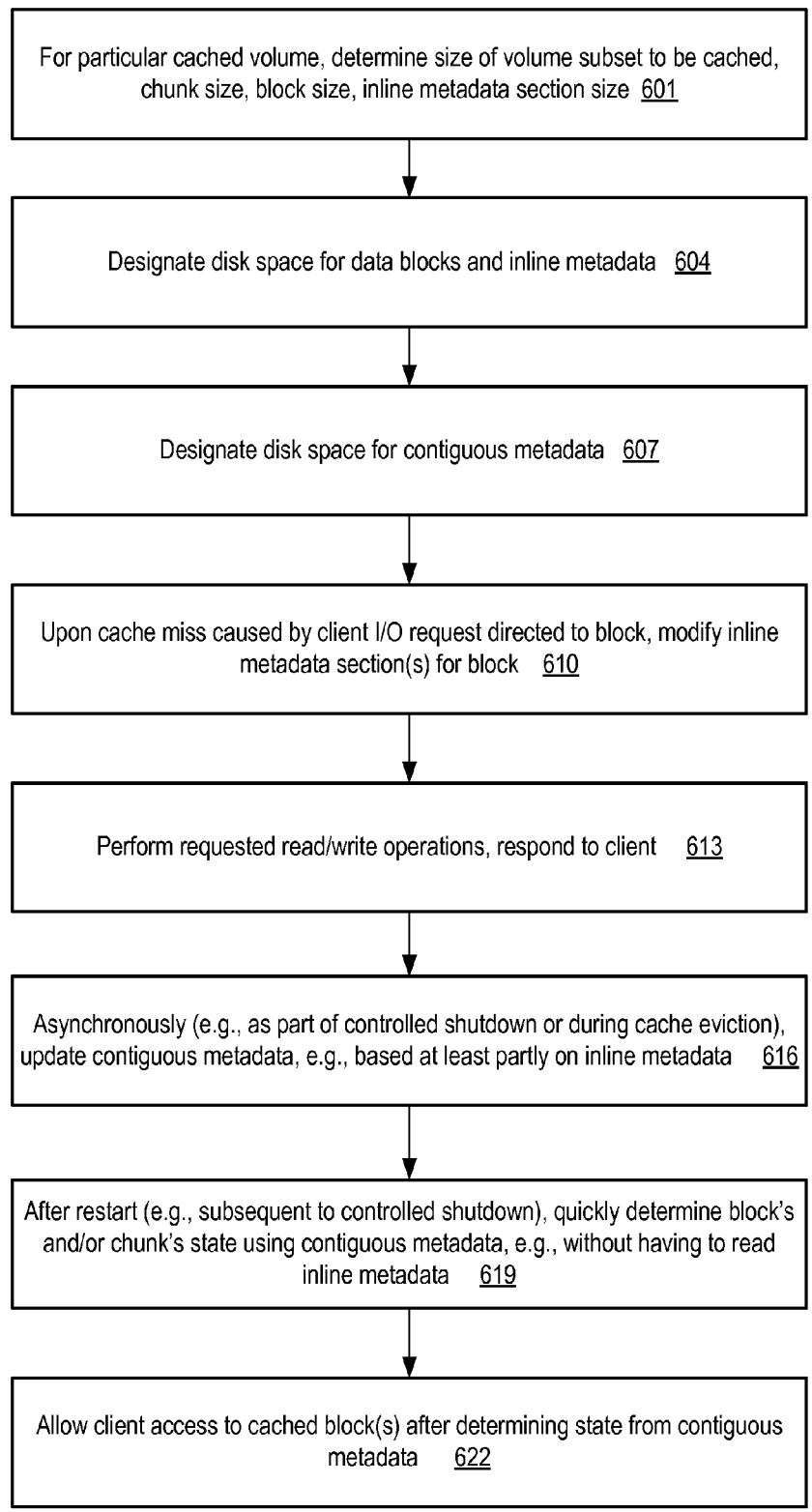
FIG. 6 is a flow diagram illustrating aspects of the operation of a storage gateway appliance related to cache metadata management, according to at least some embodiments.

Methods for Managing Cache Metadata, Client-Initiated Writes and Client-Initiated Reads FIG. 6 is a flow diagram illustrating aspects of the operation of a storage gateway appliance related to cache metadata management, according to at least some embodiments. As shown in element 601 of FIG. 6, the maximum size of the subset of a volume that is to be cached may be determined, e.g., based on input provided by the client 148 that owns or manages the volume. In addition, the data chunk size, data block size, and the sizes of the inline metadata sections may be determined. In some embodiments, the data chunk size, data block size, and inline metadata sizes may be identical for different volumes, while in other embodiments, any combination of these three parameters may differ for different volumes. The disk space designated for storing inline metadata sections and data blocks may be identified (element 604), and the disk space to be used for contiguous metadata may be determined (element 607).

After the space for the different types of metadata and the data blocks has been designated, client I/Os may be enabled. When a client requests a read operation or a write operation that causes a cache miss (i.e., the targeted data block is not found in the disk cache), the disk space to be used for the targeted data block may be initialized, which may include writing to the inline metadata section(s) corresponding to the targeted data block (element 610). In the case of a write miss, in the depicted embodiment, the inline metadata section or sections for the disk block may first be updated to reflect the write, a corresponding entry may be added to the upload buffer, and the bytes modified may be written to the appropriate data block within the appropriate chunk (element 613) of the cache disk. In the case of a read miss, the requested data block may be downloaded from the remote storage service 120, the inline metadata may be updated, and the downloaded data may be written to the cache. In the depicted embodiment, the targeted data block and the inline metadata section(s) associated with the target data block may have to be written to, before a response is sent to the client who submitted the I/O request. Modifications to the contiguous metadata may not be required prior to responding to the client in the depicted embodiment.

At some later point in time, asynchronously with respect to the inline metadata update, the contiguous metadata section of the cache disk may be updated to reflect the contents of the inline metadata (element 616). The manner in which the contiguous metadata update is scheduled may vary in different embodiments—e.g., in some embodiments, a background process may periodically update the contiguous metadata, while in other embodiments the contiguous metadata may be updated during eviction cycles and/or during controlled shutdowns. After a restart that follows a controlled shutdown, the state of the data blocks of one or more chunks of the volume may be determined quickly by reading the contiguous metadata (element 619) into memory, without reading all the inline metadata for the chunks. Client access may then be enabled for the blocks of the cached chunks (element 622).

Figure 7:
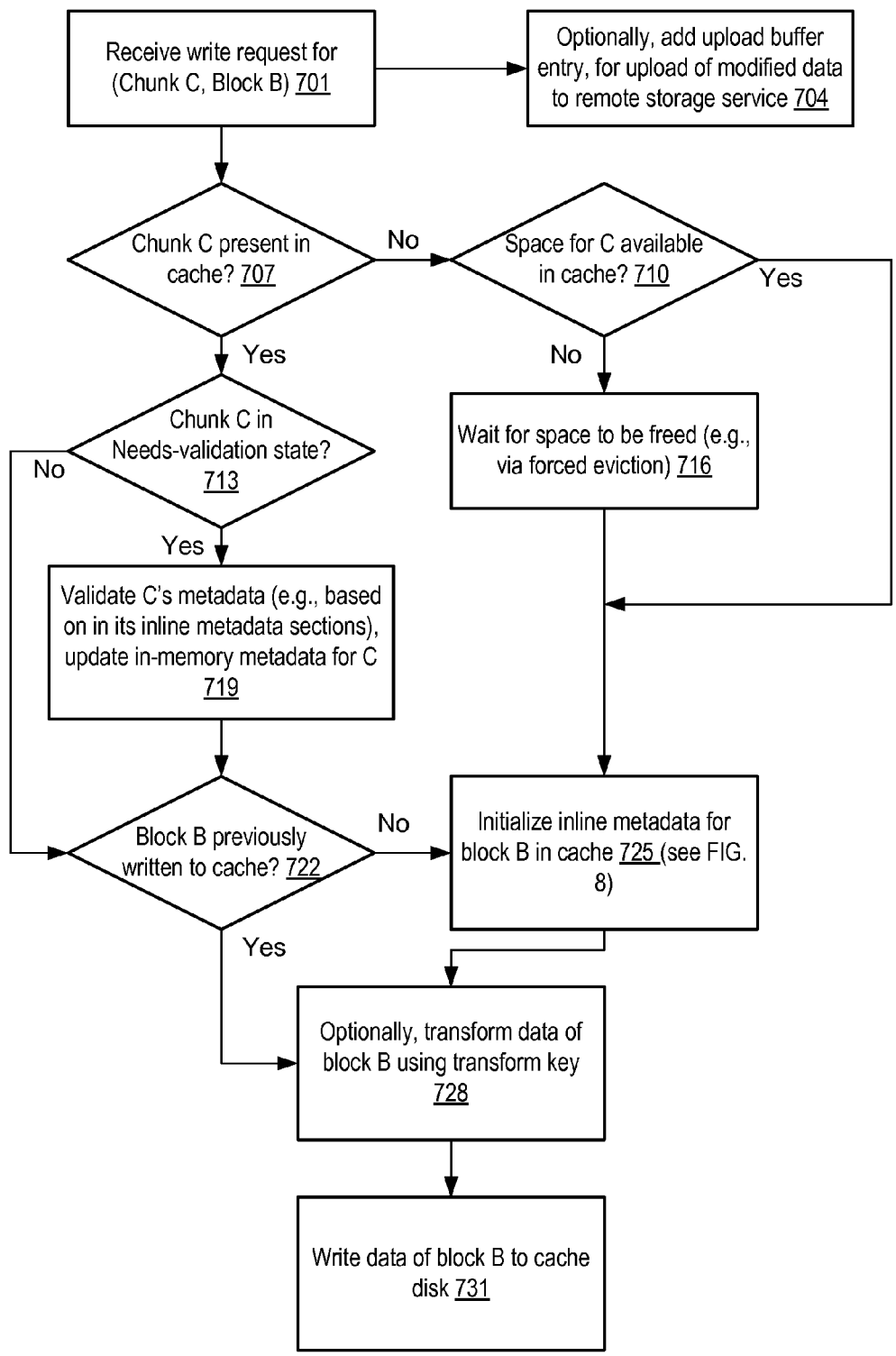
FIG. 7 is a flow diagram illustrating aspects of the operation of a storage gateway appliance related to handling a client write request, according to at least some embodiments.

FIG. 7 is a flow diagram illustrating aspects of the operation of a storage gateway appliance related to handling a client write request, according to at least some embodiments. A write request targeted to at least a portion of a block B of a chunk C of a cached volume may be received from a client (element 701). In the depicted embodiment, an upload buffer entry may be optionally added (element 704), containing the modified data to be eventually uploaded to the remote storage service 120. In those embodiments in which an upload buffer entry is written, the entry may be written asynchronously with respect to the other operations performed in response to the write request in some implementations, while in other implementations the entry may have to be committed or completed before a response to the write request is provided to the client.

Cache metadata (typically, the in-memory version of the metadata) may be consulted to determine whether the chunk C is present in the cache (element 707). If the chunk C is not present in the cache, a determination may be made as to whether sufficient free disk space exists in the cache to add another chunk (element 710) Under most operating conditions, the evictor 230 may have ensured that sufficient free space is available in the depicted embodiment (in the form of chunks that are designated as being in an "Unknown" state, as described below in further detail with respect to FIG. 11). If sufficient free space cannot be found, however, further processing of the write miss may have to wait until sufficient space becomes available, which may be achieved, e.g., by forced eviction of one or more chunks (element 716). Once sufficient space is found in the disk cache for the targeted chunk, the inline metadata for the targeted data block B may be initialized (element 725). Details of block initialization are described below with reference to FIG. 8. After the data block B has been initialized, in some embodiments the client-updated data may be modified or transformed using the transform key of the chunk C (element 728) and written to the disk cache (element 731).

If the target chunk C is found in the cache (as also determined in element 707), the chunk's state may be determined. The chunk may be in any of a number of states, including a special "Needs-validation" state into which at least some chunks may be placed during crash recovery, as described in further detail below with reference to FIG. 12. If the chunk is in "Needs-validation" state, C's metadata in memory may be validated using the inline metadata sections on disk in the depicted embodiment (element 719), and after validation, the state may be changed from needs-validation to, for example, "Clean" or "Dirty" depending on the contents of the inline metadata. If the chunk is not in "Needs-validation" state, or after the validation operations indicated in element 719 are completed, the in-memory metadata may be checked to see if the targeted data block has already been written to the disk cache (e.g., as a result of an earlier write request) (element 722). If the block was not previously written, the block may be initialized (element 725). If the block was previously written, initialization may not be required, and the modified data may be written to the disk cache (element 731). It is noted that in the case of a write hit in the cache, i.e., when a subsequent client write is directed to the same block that was previously written to the cache, no metadata updates may be required in at least some embodiments—e.g., the new modifications indicated in the write request that resulted in the hit may simply be applied to the data block, without any new updates to metadata.

Figure 8:
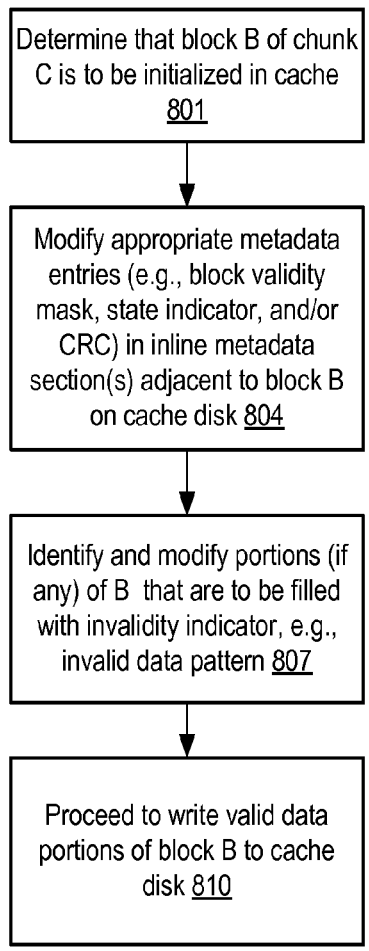
FIG. 8 is a flow diagram illustrating aspects of the operation of a storage gateway appliance related to data block initialization, according to at least some embodiments.

FIG. 8 is a flow diagram illustrating aspects of the operation of a storage gateway appliance related to data block initialization, according to at least some embodiments. During the time that a data chunk is present on a cache disk of the storage gateway 180, numerous read and/or write requests may be received, each directed to portions or all of one or more data blocks of the chunk. Consider an example scenario in which a chunk comprises 4 Megabytes of data, divided into 64 blocks, each of size 64 KB. During the lifetime of the chunk within the cache (e.g., between the time that the chunk is allocated and the time it is evicted), several I/Os directed to the same 64 KB data block B (or to portions of the data block B) may be received. In at least some embodiments, the first time during this period that an I/O directed at B is received, B may be "initialized" with respect to the disk cache. During this initialization, an inline metadata entry or entries for the data block may be written, as described below. When subsequent I/Os are directed at B, inline metadata may not need to be updated in some implementations (unless the chunk's state changes from "Clean" to "Dirty" or vice versa). Thus, the overhead of writing even the inline metadata may be kept quite low in such implementations.

As shown in element 801 of FIG. 8, in the depicted embodiment, a determination may be made (e.g., by cache disk pool manager 202 or some other component of the storage gateway appliance 180) that a block B of chunk C is to be initialized. Such a determination may be made in response to a write miss in the cache (as illustrated in element 725 of FIG. 7), or in response to a read miss (as described below with respect to FIG. 9). The appropriate inline metadata entries to be modified may then be identified. In some embodiments, in which inline metadata sections alternate with the data blocks on the cache disk, both inline metadata entries that are adjacent to the data block B (the head and the tail inline metadata sections) may be modified. In other embodiments, only one inline metadata section may be modified during initialization. In different embodiments, a subset of the kinds of metadata entries shown in FIG. 5 may be written to the inline metadata section(s) (element 804 of FIG. 8), such as the block validity mask (in which an additional bit may be set to indicate that a new valid data block is being added), the state indicator (which may be set, e.g., to "Clean" if the initialization is due to a client's read request, or to "Dirty" if the initialization is being performed in response to a write request from a client), and/or an updated metadata CRC.

If the client request that resulted in the initialization was a write directed to a portion of the data block rather than to the entire block (e.g., if the client submitted a write for 4 KB of a 64 KB block), in some embodiments the remainder of the data block may be filled with an invalid data pattern (e.g., pattern 561 of FIG. 5). In some implementations, even in response to a read request from a client, only a portion of a data block may be retrieved from the remote storage service, and as a result invalid data patterns may be written even in response to some read requests. The portions of the block (if any) that are to be filled with an invalidity indicator such as the invalid data pattern 561 may be identified (element 807) and written to. As noted above, while the cache storage of the appliance is organized as data chunks in the depicted embodiment, with each chunk comprising a plurality of data blocks, clients may submit I/O requests in units that differ from the data block size and the data chunk size—e.g., in one implementation, 4-megabyte data chunks may be used, each including 64 data blocks of 64-kilobytes each, but clients may direct reads or writes to any multiple of 512-byte units starting at any 512-byte offset within the data chunk. In some implementations, clients may submit I/O requests of any number of bytes, or starting at any offset, so that alignment to 512-byte multiples may not be required. In some embodiments, the portions of the block that do not overlap with the client's modifications in the case of a write request (or the data downloaded from the remote storage service for a client read request) may not be completely filled with the invalidity indicator—e.g., the invalidity indicator may be written only once in every 512 bytes or 1024 bytes while the remaining bytes may be initialized with zeros in one implementation. Subsequently, the valid portions of the data block may be written to the cache disk (element 810). In some implementations, the data may be transformed, e.g., using a data transform key 526 associated with the chunk C, before being written to disk, as was also indicated in element 728 of FIG. 7.

Figure 9:
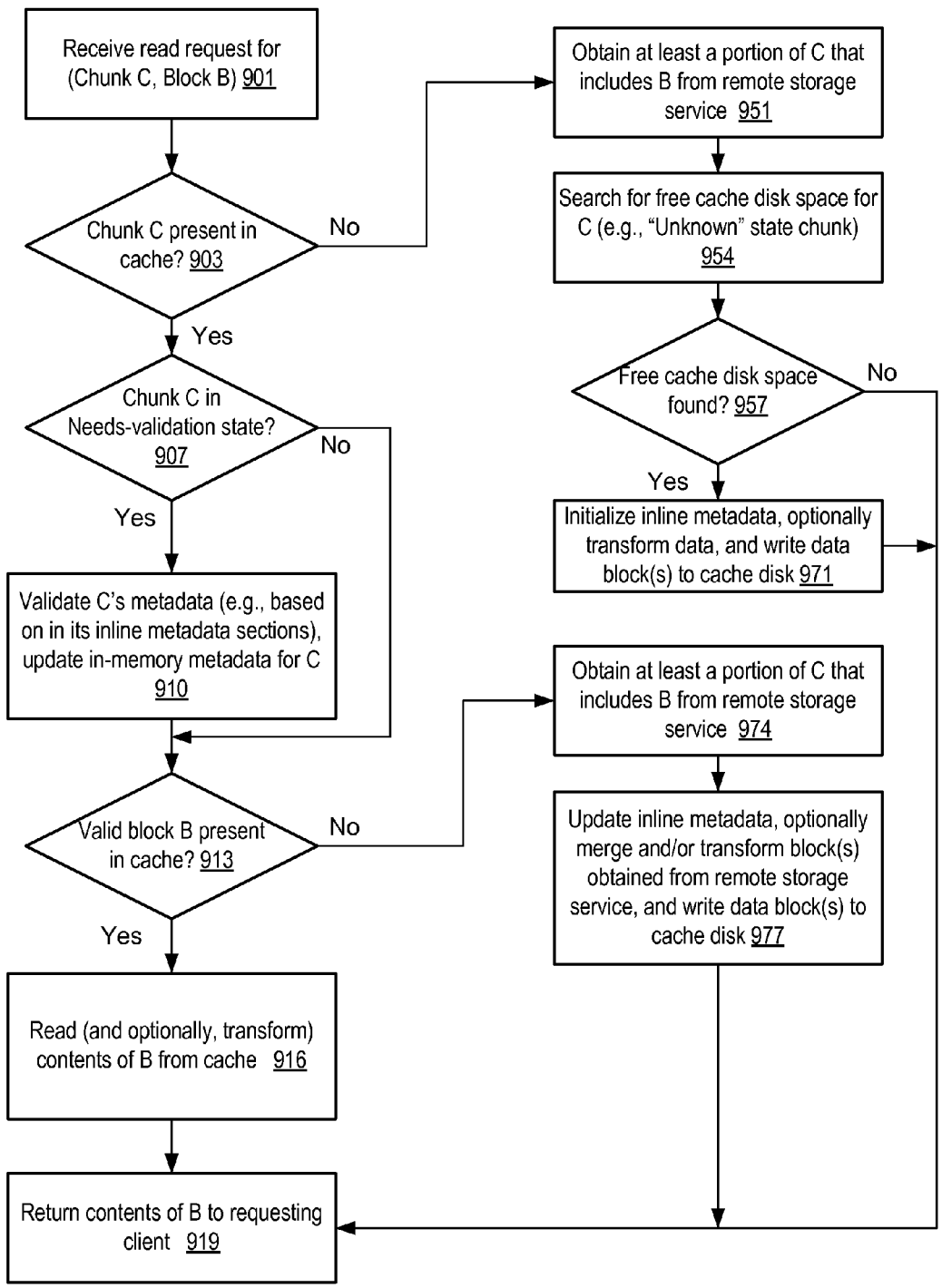
FIG. 9 is a flow diagram illustrating aspects of the operation of a storage gateway appliance related to handling a client read request, according to at least some embodiments.

FIG. 9 is a flow diagram illustrating aspects of the operation of a storage gateway appliance related to handling a client read request, according to at least some embodiments. As shown in element 901, a read request directed to at least a portion of a block B of a chunk C may be received at a component of the storage gateway appliance (such as the cache disk pool manager 202) in the depicted embodiment. Metadata (typically, in-memory metadata) may be checked to determine whether chunk C is present in the cache (element 903). If chunk C is present, its state may be checked to determine whether it is in "Needs-validation" state (element 907). If C is in "Needs-validation" state, the corresponding inline metadata sections may be read to update the in-memory metadata (element 910). After a confirmation that the in-memory metadata is valid (either as a result of reading the inline metadata sections, or because the chunk C was not in "Needs-validation" state), the in-memory metadata may be checked to determine whether a valid block B is present in the cache (element 913). In at least some embodiments, the validity of the block B may be checked by (a) verifying that the block validity mask 551 confirms that the block is present and (b) verifying that the data of block B does not contain any instance of the invalidity indicator being used, such as invalid data pattern 561. As noted above, it may be the case that, as a result of an earlier client write request, the block validity mask 551 indicates that the block is present in the cache in some embodiments. However, if only a subset of the block had been written by the client, some portion or all of the remainder of the block may have been populated with one or more invalidity indicators in such embodiments. Thus, while the block validity mask may indicate that the block and its metadata has been initialized, and that at least some of the block's data is valid, the mask by itself may be insufficient to validate the block's data considered as a whole. If either of the above conditions is not met, e.g., if the block validity mask does not indicate that B is valid and/or if an invalidity indicator is found, the block may be considered invalid. If the block is found to be valid, the contents of the block may be read and returned to the requesting client (element 919). In some implementations where a data transform key 526 is being used, e.g., for enhanced data security, the data may be transformed after reading from disk and before providing it to the client.

If the chunk C is not present in the cache (as determined in element 903), at least a portion of C that comprises the block B may be retrieved from the storage service (element 914). In some embodiments, only the portion of the block that was requested by the client may be obtained from the remote storage service. In other embodiments, if the client requested a subset of a block, the entire block may be retrieved, while in yet other embodiments, a plurality of blocks comprising the requested portion of data may be retrieved. In at least one embodiment, depending for example on the pattern of requests detected at the storage gateway appliance, one or more prefetch operations (some of which may be performed at a low priority) for blocks other than the specific block requested by the client may be initiated, as described below in further detail with respect to FIG. 13. A search for free cache disk space for the retrieved data may be conducted (for example, by determining whether at least one chunk designated as being in the "Unknown" state by the cache evictor is present in the cache) (element 954). If free cache disk space is found (as determined in element 957), inline metadata may be initialized for the retrieved block or blocks (using operations similar to those illustrated in FIG. 8), as indicated in element 971. In some embodiments, the retrieved data may be transformed using the data transform key 526 prior to being written to the disk.

If chunk C is present in the cache but a valid block B is not present (as determined in element 913), a portion of the chunk C that includes at least B may be retrieved from the storage service (element 974). As described above with respect to similar operations illustrated in element 951, more data than just the specific portion indicated in the read request may be retrieved in some embodiments, e.g., multiple blocks may be retrieved, and/or a low-priority prefetch operation may be initiated for the data not specifically requested. The inline metadata may be updated to reflect the downloaded data (e.g., by updating the block validity mask 551) (element 977). In some embodiments, if a portion of the downloaded block (or blocks) was previously written to, and the modified portion is present in the cache, a merge may be required between the downloaded data and the previously-written data. In some implementations, the data may be transformed using data transform key 526 before being written to disk. If the block B contained an invalidity indicator prior to the download of the block from the remote storage service, the invalidity indicator may be removed or overwritten when the retrieved data block is written to the cache disk. The requested data may be provided to the client from whom the read request was received (element 919).

It is noted that at least in some embodiments, depending for example on the types of programmatic interfaces exposed to clients by the storage gateway appliance (e.g., by interface manager 232), a single client I/O request may comprise more than one read request, more than one write request, or a combination of read and write requests. When such an I/O comprising multiple individual read and/or write requests is received, the appliance may examine the individual requests, and coalesce some of the requests if possible in some embodiments (e.g., requests to read several small portions of data blocks may be combined into one read request) before initiating the appropriate types of operations illustrated in FIG. 7, 8 or 9. In other embodiments, each individual request may be handled separately.

Chunk State Transitions

Figure 10:
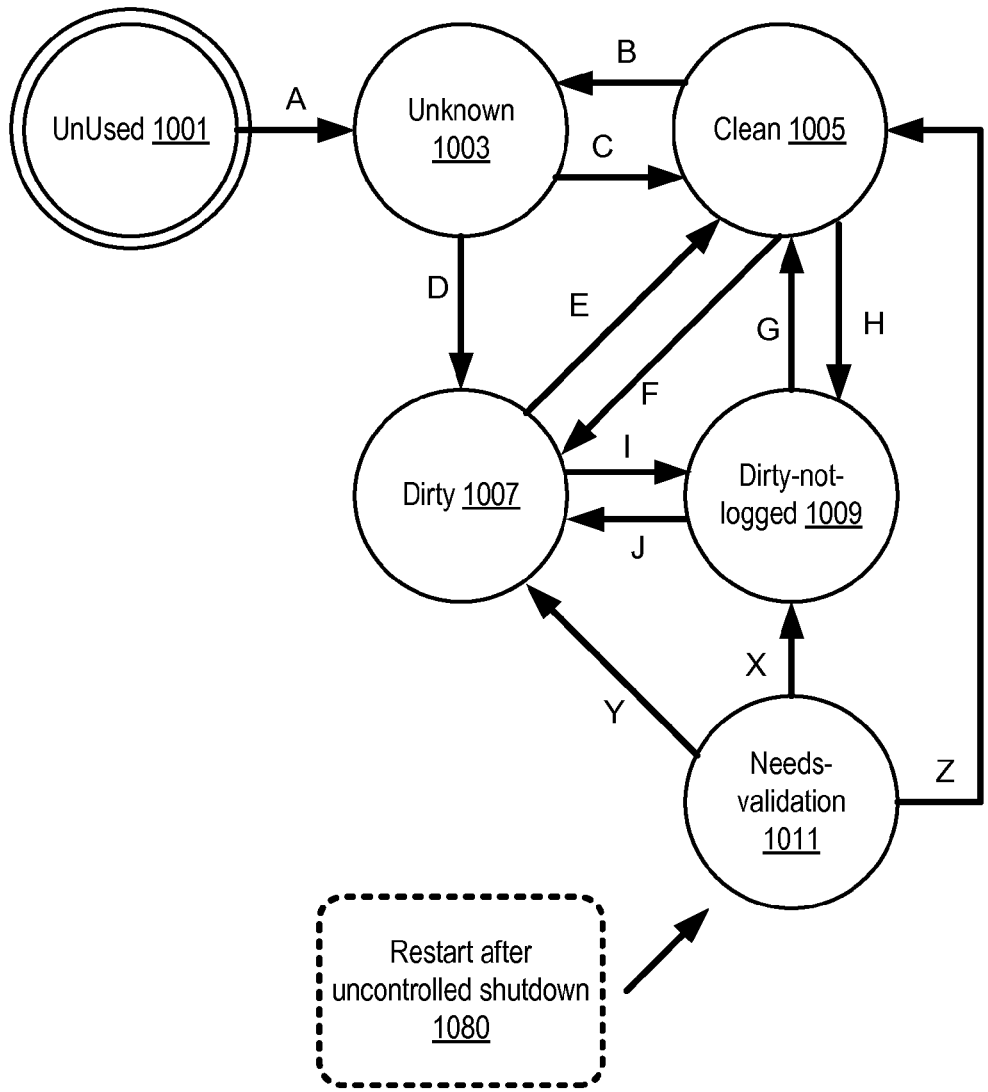
FIG. 10 illustrates example state transitions of a data chunk of a volume cached at a storage gateway appliance, according to at least some embodiments.

A given data chunk of a cached volume may pass through several caching states during its residency in a storage gateway appliance cache in some embodiments. FIG. 10 illustrates example state transitions of a data chunk of a volume cached at a storage gateway appliance, according to at least some embodiments. In the illustrated embodiment, all chunks may begin in the "UnUsed" state 1001, e.g., when disk space is initially designated for a chunk, prior to any client I/O requests, the chunk may be considered in "UnUsed" state. A state transition labeled A may lead to the "Unknown" state 1003, indicating that the chunk is available for use for incoming client read or write requests. State transition A may occur when an "UnUsed" chunk is first pre-allocated (e.g., by evictor 230 in response to determining that the number of chunks usable for future client I/Os whose data is not already in the cache has fallen below a threshold—further details regarding evictor operation are provided below with respect to FIG. 11).

From the "Unknown" state, the chunk may move to "Clean" state 1005 or "Dirty" state 1007. A chunk may be said to be in "Dirty" state 1007 if at least one upload buffer entry indicating client-initiated modifications to the chunk's data has not yet been uploaded to the storage service 120. When all the outstanding upload buffer entries for a chunk have been uploaded to the storage service 120, the chunk may move from "Dirty" to "Clean" state, as indicated by transition E. In the depicted embodiment, a chunk is considered to be in "Clean" state when it has no outstanding upload buffer entries that are yet to be uploaded to storage service 120. The "Clean" state may be reached from the "Unknown" state (transition C) if one or more data blocks were read from the storage service in response to a read request from a client. Transition B, from "Clean" to "Unknown", may occur as a result of an eviction, as described below in further detail. Transition F, from "Clean" to "Dirty", may occur when a client submits a write request directed to a data block of a "Clean" chunk. Under normal operating conditions, in the depicted embodiment, chunks may typically be in "Clean", "Dirty" or "Unknown" state, transitioning between these three states depending on when they are selected for eviction, upon the mix of read and write requests received from clients, and/or upon the rate at which upload buffer entries are uploaded to the storage service 120.

Under certain conditions, the upload buffer for a given cached volume may become full in the depicted embodiment—e.g., if the rate at which uploads are performed falls behind the rate at which new write operations are requested by clients for a sustained period of time. If the upload buffer becomes full, the cached volume may be moved from an "Active" or "Normal" volume state to a "Pass-through" volume state (note that FIG. 10 illustrates chunk states, not volume states). While a cached volume is in "Pass-through" state in the depicted embodiment, if a new client write request W is received that is directed to a chunk that is not present in cache, and if all the chunks that are cached are in "Dirty" state, a particular "Dirty" chunk D1 may be selected for immediate upload to the storage service, so that the latest write W can be accommodated in the cache. The chunk D1 may be selected for immediate upload using, for example, a least-recently-used policy. If at least one chunk is in "Clean" state when the write request W arrives, that clean chunk may be evicted and replaced by the chunk to which W's data belongs in some embodiments. The volume may return to "Active" state from "Pass-through" when a threshold amount of space becomes available in the upload buffer to accommodate entries for incoming writes.

In the embodiment depicted in FIG. 10, transition I from "Dirty" to "Dirty-not-logged" state 1009 may occur if the volume goes into "Pass-through" state, as described above, while the chunk is in "Dirty" state. The "Dirty-not-logged" state 1009 of a given chunk C may thus indicate that there are at least some upload buffer entries of the chunk C that have not yet been uploaded to the storage service, and that the volume to which C belongs has entered but not yet exited the "Pass-through" state. Transition H, from "Clean" to "Dirty-not-logged", may occur if a write to a block of a "Clean" chunk is received while the volume is in "Pass-through" state. Transition J from "Dirty-not-logged" to "Dirty" may occur when the volume state changes from "Pass-through" back to "Active" in the depicted embodiment, and at least one upload buffer entry for the chunk remains to be uploaded to storage service 120. Similarly, transition G from "Dirty-not-logged" to "Clean" may occur if (a) the volume exits "Pass-through" state and (b) all upload buffer entries for the chunk have been uploaded.

In the depicted embodiment, if an uncontrolled shutdown or crash occurs at the storage gateway appliance, as indicated in element 1080 of FIG. 10, and the appliance is restarted after the uncontrolled shutdown, at least some of the chunks may be moved to a "Needs-validation" state 1011. In-memory metadata reflecting the most current state of various blocks and chunks may have been lost during the uncontrolled shutdown, e.g., some of the current metadata may not have been written to the contiguous metadata section at the time of the shutdown. In order to be able to quickly resume client I/O operations, metadata may be read into memory from the contiguous metadata section of each cache disk. While much of the metadata read in from the contiguous metadata section may be valid, some portion may be invalid because, for example, the corresponding inline metadata had not been copied to the contiguous metadata section prior to the uncontrolled shutdown. The "Needs-validation" state may be used to indicate that the in-memory metadata for the chunk is to be validated using the corresponding inline metadata sections in some embodiments.

In one embodiment, all the chunks of a cached volume that were present in the cache at the time of the crash may be placed in "Needs-validation" state (by modifying the in-memory metadata's state entry) upon restart after a crash. Client I/O operations may be allowed to resume to a given chunk as soon as all the contiguous metadata for the chunk has been read into memory and the state of the chunk has been changed to "Needs-validation" in memory. When a read request or a write request is received, and the chunk is in "Needs-validation" state, the extra step of synchronizing the in-memory metadata with the inline metadata sections of the chunk may be performed, as illustrated in element 719 of FIG. 7 and element 910 of FIG. 9. After the metadata is validated using the inline metadata sections on disk, the chunk state may change from "Needs-validation" to "Dirty" (transition Y of FIG. 10), from "Needs-validation" to "Clean" (transition Z of FIG. 10), or from "Needs-validation" to "Dirty-not-logged" (transition X of FIG. 10). Transition X may occur if, for example, the volume is in "Pass-through" state during restart because the upload buffer is full. Transition Y may occur if the volume is not in "Pass-through" state and the inline metadata indicates that the pre-crash state was "Dirty", and transition Z may occur of the volume is not in "Pass-through" state and the inline metadata indicates that the pre-crash state was "Clean". In some embodiments, a complete bootstrapping operation may be performed after a crash, in which all the on-disk chunks of the volume are written to the storage service 120, and the volume may be placed in "Pass-through" state until the bootstrapping operation completes. In one embodiment, at least a portion of the bootstrapping operation may be performed at a low priority, e.g., using a background process.

According to at least one embodiment, not all the chunks that were present in the cache when the crash occurred may be placed in "Needs-validation" state upon restart. For example, chunks that were in "Unknown" state (e.g., as result of a recent eviction iteration) may be given special treatment in some such embodiments. Instead of placing the chunk in "Needs-validation" state, for example, which would result in an eventual synchronization of in-memory metadata with the inline metadata, the in-memory metadata for chunks that were in "Unknown" state at the time if the crash may be synchronized immediately with inline metadata, prior to allowing any new client I/O operations. In some embodiments, not all the states and transitions illustrated in FIG. 10 may be implemented, while in other embodiments, additional states and/or transitions may be implemented.

Cache Eviction

Figure 11:
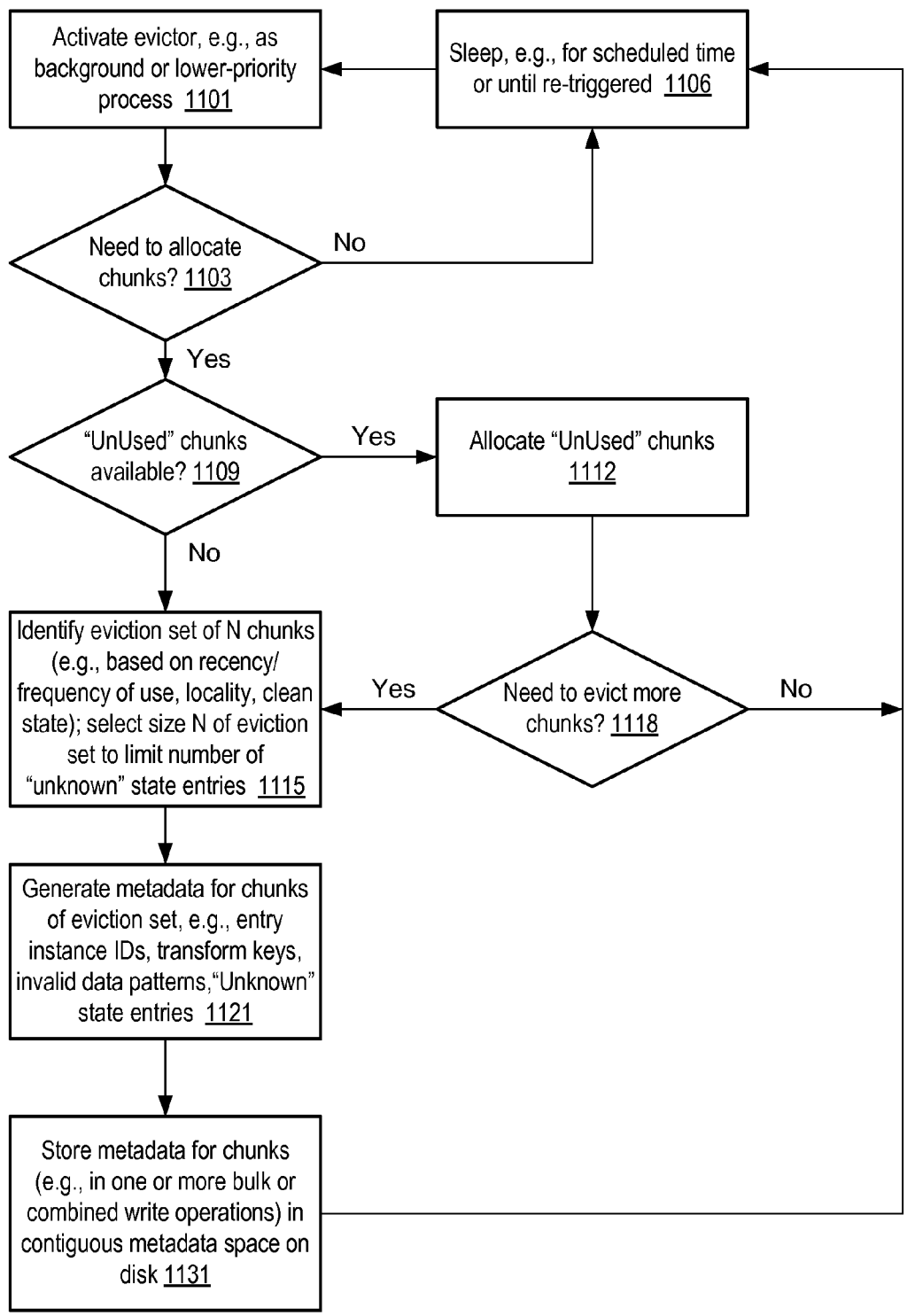
FIG. 11 is a flow diagram illustrating example cache eviction operations at a storage gateway appliance according to at least some embodiments.

FIG. 11 is a flow diagram illustrating example cache eviction operations at a storage gateway appliance according to at least some embodiments. As noted earlier, a storage gateway appliance 180 may comprise an evictor 230 in some embodiments, responsible for preemptively freeing previously-allocated disk space on cache disks. Evictions may be performed in cycles or iterations in some embodiments, such that a number of chunks are evicted together during a given cycle. The scheduling of the start of an eviction cycles may be determined based on any combination of various factors in different embodiments, such as an amount of time that has elapsed since the last eviction cycle, the arrival rates of client write requests and/or read requests, measurements of network traffic between the storage gateway appliance 180 and the storage service 120, and so on. As shown in element 1101, the evictor 230 may be activated to start a particular eviction cycle, for example as a background or lower-priority task with respect to the handling of read and write requests described above. The evictor 230 may determine whether any additional chunks need to be allocated (element 1103). Allocation of a chunk may result in the chunk's state being changed to the "Unknown" state 1003 illustrated in FIG. 10. Accordingly, when making the determination as to whether more chunks need to be allocated, the evictor 230 may, for example, check the current number of chunks in "Unknown" state, and if that number is below a threshold, decide to proceed with the eviction cycle. If the evictor 230 determines that additional allocations are not required at this time, it may sleep or wait until the next eviction cycle is triggered or scheduled (element 1106).

If the evictor 230 determines that more chunks need to be allocated, it may determine whether any chunks in "UnUsed" state are available (element 1109). If there is at least one chunk in "UnUsed" state, the chunk or chunk(s) in UnUsed state may be selected for allocation (element 1112), e.g., by marking their state as "Unknown" in the in-memory metadata. After allocating any available "UnUsed" chunks, the evictor may determine whether the threshold number of free chunks has been reached, or whether some previously allocated chunks have to be evicted from the cache (element 1118). If some chunks have to be evicted, an eviction set of N chunks may be identified from among the chunks currently in the disk cache (element 1115). The eviction set may be selected based on any combination of several criteria in different embodiments, such as, for example, how recently the chunks were accessed by clients. A least-recently-used selection policy may be employed in some implementations to identify specific chunks for inclusion in the eviction set. In at least one embodiment, chunks may be chosen for eviction based at least in part on how frequently they are accessed by clients—e.g., a "least-frequently-used" policy may be used for selecting eviction candidates. In one embodiment, locality may be used for selecting eviction set candidates—e.g., two or more chunks that are physically adjacent on disk may be selected for eviction, in preference to chunks that are not adjacent, so as to optimize for large sequential writes. Thus, the proximity of location or address of a given chunk, to the locations or addresses of other chunks being considered for eviction, may serve as a criterion for inclusion of the given chunk in the eviction set in such embodiments. In some embodiments, the evictor may only select chunks that are already in "Clean" state (because they have no outstanding upload buffer entries that have to be uploaded to the storage service), while in other embodiments the evictor may select "Dirty" chunks and expedite the upload of entries from the upload buffer during the eviction cycle for the "Dirty" chunks so that the chunks may be included in the eviction set. Metadata indicating "Clean" versus "Dirty" chunk state may be used to select candidates for the eviction set even in some embodiments in which upload buffers are not used. As explained below with respect to FIG. 12, the number of chunks that are evicted at a given time (i.e., the size "N" of the eviction set) may potentially impact the time it takes to recover after an unplanned shutdown of the appliance, since different recovery-related operations may be performed for chunks in "Unknown" state than for chunks in other states in at least some embodiments. Accordingly, in such embodiments, the evictor may be configured to select a size of the eviction set that keeps the total number of "Unknown" state chunks below a threshold value, to reduce the likelihood of long recovery times.

After an eviction set with an adequate number of chunks (e.g., enough chunks to reach a target desired number of "Unknown" state chunks) has been found, the evictor may generate new metadata for the eviction set's chunks (element 1121) in the depicted embodiment. The new metadata may include, for example, "Unknown" state indicators 546, new data transform keys 526, new invalid data patterns 561, and new cache entry instance identifiers 521 in various embodiments. The new cache entry instance identifier 521 of a given cache may serve as an indicator of a new usage period for the cache disk space allocated to the chunk, and may be used later to invalidate out-of-date data blocks that may remain in the cache disk space from a previous usage period. In at least some implementations, the same string may be used as a data transform key 526, an invalid data pattern 561, or a cache entry instance identifier 521—e.g., a single 128-bit or 256-bit value may be generated for use for several of these purposes (thus reducing the size of the metadata for each chunk and/or data block). The data blocks present on the cache disks (and the corresponding inline metadata sections) may not be overwritten during eviction in the depicted embodiment. Instead, new metadata elements may be generated in memory and written to the contiguous metadata area of the cache disk(s), as shown in element 1131 of FIG. 11. In at least some embodiments, the new metadata may be written in bulk (e.g., using a few sequential writes, with each write comprising metadata elements for a plurality of chunks of the eviction set), instead of being written in separate writes for each chunk of the eviction set. At the end of the operations corresponding to element 1131 in the depicted embodiment, the state of each of the chunks of the eviction set (in memory and in the contiguous metadata sections of the cache disk(s)) has been set to "Unknown", new metadata entries such as the cache entry instance identifiers are present in memory and in the contiguous metadata section on disk, while the data blocks and inline metadata entries may remain as they were before the eviction iteration began. The evictor may resume its sleep (element 1106) until the next eviction cycle is started.

Following the eviction iteration depicted in FIG. 11, when a new data block is to be written for a chunk that is currently not present in the cache, one of the "Unknown" state chunks may be selected for use in the depicted embodiment. Depending on whether the new data block is being written as a result of a client-requested or a client-requested write, the state of the chunk (in memory and/or in the inline metadata section for the data block) may be set to "Dirty" (for a write) or "Clean" for a read. Operations corresponding to the use of an "Unknown" state chunk for a client write are illustrated in elements 710 onwards of FIG. 7, and for a client read in elements 954 onwards of FIG. 9. By performing evictions proactively as described above, before the free disk space available for the cache falls to very low levels, the storage gateway appliance 180 may be able to reduce the variability of responsiveness to client I/O requests, since enough chunks may typically be freed by the evictor often enough to avoid long delays when free chunks for incoming client requests are needed.

In at least one embodiment, various parameters associated with cache eviction, such as the size of the eviction set, the interval between eviction cycles, and/or the priority of the eviction process, may be tunable. Various performance and/or other statistics associated with the use of the gateway appliance may be collected in some embodiments, such as the mean time taken to obtain a free chunk for writing data submitted by a client as part of a write request, the mean time taken to obtain a free chunk for storing data downloaded from the storage service 120 for a client read request, the number of times that read request processing failed to find a free chunk, the mean number of chunks in "Unknown" state, the utilizations of the cache disks, the utilizations of the storage gateway appliance processors, and/or the time taken for an eviction cycle (which may be a function of the priority of the evictor). In at least some embodiments, the distribution of these metrics over time may be determined, i.e., more statistics than just the mean values may be determined. Based at least in part on some subset or all of the collected metrics, eviction parameters may be automatically tuned in some embodiments. For example, the size of the eviction set may be decreased if, or the interval between eviction cycles may be increased, if the statistics indicate that in almost every case that a free chunk is needed, it can be found very quickly.

Crash Recovery

Figure 12:
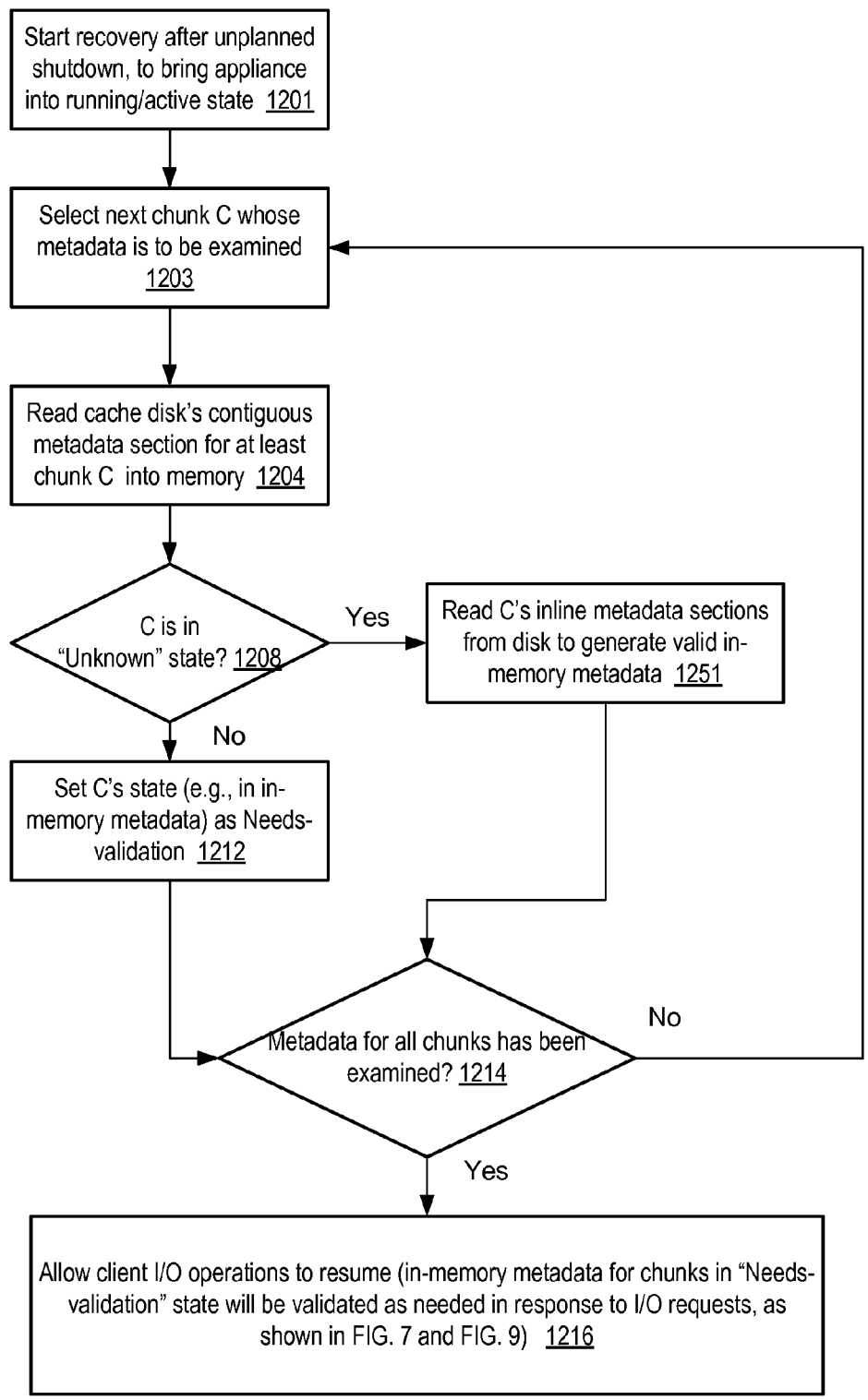
FIG. 12 is a flow diagram illustrating aspects of the operation of a storage gateway appliance after a restart following an unexpected shutdown, according to at least some embodiments.

FIG. 12 is a flow diagram illustrating aspects of the operation of a storage gateway appliance after a restart following an unexpected shutdown or crash, according to at least some embodiments. In at least some embodiments, one of the design goals of the storage gateway appliance 180 may be to minimize the downtime resulting from an unplanned shutdown—e.g., when one of the appliance's processes crashes unexpectedly, a goal may be to resume client I/Os as quickly as possible. In order to resume client I/Os, in-memory metadata for the cached chunks (which was lost in the shutdown) may have to be rebuilt from on-disk metadata (the vast majority of which, except for any in-flight metadata writes to disk at the time of the shutdown, may typically survive the shutdown). In embodiments in which at least a portion of the current on-disk metadata is stored in inline metadata sections on disk, as illustrated in FIG. 3, a substantial amount of time may be required to read all the inline metadata, especially for large cached volumes which may span terabytes or more of disk space. Therefore, in keeping with the goal of minimizing the time for which client I/O operations are suspended or disabled, in at least some embodiments a recovery technique that relies on quickly reading metadata for the chunks from the contiguous metadata section(s) 352 on disk may be employed.

As shown in element 1201 of FIG. 12, recovery of the storage gateway appliance 180 may be initiated to bring the appliance into a running or active state after an unplanned shutdown or crash. All in-memory metadata may have been lost due to the shutdown in the depicted embodiment. The recovery may begin by selecting the next chunk C whose metadata is to be examined and/or reconstructed (element 1203) in some embodiments. In order to rebuild the in-memory metadata for a given chunk C stored on a particular cache disk 250, the contiguous metadata section of the cache disk for that chunk C (as well as the contiguous metadata for other chunks stored on the disk) may be read into memory (element 1204). Because of the contiguous storage of metadata for numerous chunks, only a few, relatively large disk reads may be required in some implementations to load metadata for a plurality of chunks in to memory, thus reducing the total number of I/Os needed during this phase of recovery. Depending on the state of the chunk C as indicated in the contiguous metadata, different sets of actions may be taken next in the depicted embodiment. Depending on the size of the eviction set relative to the total number of chunks resident on disk, and on the rate at which client I/Os occur, in at least some embodiments a relatively small number of chunks may be in "Unknown" state (as a result of an eviction cycle as illustrated in FIG. 11), while the majority of chunks may be in other states such as "Dirty" or "Clean".

If a given chunk C is not in the "Unknown" state (as determined in element 1204), C's state indicator 546 may be changed to "Needs-validation" (element 1212) as an indication of a validation requirement for the chunk's metadata. In some implementations, the new state indicator value may only be updated in memory, while in other implementations the new state indicator value may also be written to the contiguous metadata section of the disk. After the chunk's state is changed to "Needs-validation", in the depicted embodiment, a determination may be made as to whether metadata for all the chunks of the storage object (e.g., the volume comprising the chunks) have been examined (element 1214). If all the chunks have been considered, client I/Os directed to the storage object may be resumed (element 1216), i.e., the storage object may be designated as being accessible for client I/O requests. If some chunks have not yet been examined, the next chunk may be selected (element 1203), and the metadata analysis for this next chunk may begin. Thus, in the embodiment depicted in FIG. 12, contiguous metadata for all the chunks of a given cached volume may have to be read, and all the chunks may have to be brought into "Needs-validation" state (or out of the "Unknown" state) before any client I/Os to any particular chunk of the volume are enabled. In other embodiments, such a requirement may not apply—e.g., I/O access may be enabled a chunk at a time, as soon as the chunk's metadata has been examined and its state changes accordingly, rather than to the entire volume at once. The fact that a given chunk C is in "Needs-validation" state may lead to the reading of the inline metadata sections of the chunk C into memory when a new I/O request directed to the chunk is received, prior to performing the requested I/O operations. The operations performed in response to client I/O requests when the targeted chunk is in "Needs-validation" state were described above (e.g., in the description related to element 713 of FIG. 7 and element 910 of FIG. 9) for at least some embodiments. The retrieval of the most current state of the metadata (from the inline metadata sections on disk) for a chunk may thus be deferred until the first post-recovery I/O directed to the chunk is received in the embodiment of FIG. 12. Although this retrieval of inline metadata may result in a longer than typical response time for that first I/O, such a deferral may help reduce the average time that client I/O requests are disabled or suspended due to the crash in the depicted embodiment, and thus may reduce overall average client I/O response times.

In the depicted embodiment, if the state of a given chunk C is "Unknown" according to the chunk's contiguous metadata (as determined in element 1208), the most current valid metadata for the chunk C may be reconstructed in memory from the inline metadata sections (element 1251) prior to checking whether all the chunk states have been examined (element 1214). Since only a relatively small number of chunks may typically be in "Unknown" state at the time of a crash, the total time taken for their metadata validation may typically be fairly short. As mentioned earlier, in at least some embodiments the evictor may be configured to select the eviction set size so as to limit the impact of "Unknown" state chunks on crash recovery—i.e., by keeping the number of chunks evicted during a given eviction iteration below a threshold, and/or by adjusting or tuning the size of the eviction set as needed. In some embodiments, metrics of crash recovery times may be tracked, and eviction set size may be reduced if recovery is found to be taking too long as a result of too many recently-evicted chunks in the "Unknown" state. The validation process for "Unknown" state chunks may include determining which (if any) data blocks of the chunk are valid, using cache entry instance identifiers 521. If the cache entry instance identifier "CEII-inline" of a given block B, as indicated in the block's contiguous metadata section, differs from the cache entry instance identifier "CEII-contiguous" obtained from the contiguous metadata section, block B may be rejected as invalid (since "CEII-contiguous" is assumed to be the more recent of the two identifiers, having been set during the most recent eviction cycle in which the chunk was selected for eviction) in the depicted embodiment. The block validity mask 551 may be set accordingly, within the in-memory metadata, the inline metadata section, and/or the contiguous metadata section.

In at least some embodiments, the types of recovery-related operations illustrated in FIG. 12 may be performed in parallel for more than one chunk, e.g., to further reduce the time before client I/Os are re-enabled. In some embodiments, in which upload buffer entries are used to upload client-initiated data modifications to the storage service 120, at least some of the contents of the upload buffer may also have to be reconstructed after a crash, e.g., as part of a foreground or background bootstrapping process. In one embodiment, the bootstrapping process, which may involve re-generating upload buffer requests for some portions or all of the blocks written to the cache as a result of earlier write requests, may have to be completed before client-initiated I/O operations are allowed.

Cache Population Optimization

As shown in FIG. 1, at least in some embodiments, data transferred in one or both directions between a storage gateway appliance 180 and a storage service 120 may pass through one or more intermediate servers 130. For example, when a client submits a read request for a block of data that is not present in the cache at the storage gateway appliance, a request for the data may be sent from the storage gateway appliance to a selected intermediate server 130, e.g., over an external network 144. In at least some embodiments, the appliance may be responsible for selecting a particular intermediate server (e.g., from among a pool of available intermediate servers) to be used for communication with the remote storage service. In other embodiments, other techniques may be used to determine the particular intermediate server 130 to be used—e.g., a load-balancer may be used to distribute requests from various appliances among a set of intermediate servers, or a particular intermediate server may be selected for use by the appliance when the appliance is initialized or restarted. The intermediate server 130 may retrieve the requested data from the storage service 120 over an internal network 140, which at least in some embodiments may have a higher bandwidth capacity and/or lower latency than the external network 144. The intermediate server 130 may then transmit the requested data to the storage gateway appliance over the external network 144. In some embodiments, the intermediate server 130 may be configurable to optimize data transfers to the storage gateway appliance 180, e.g., by pre-fetching data blocks in anticipation of future client I/O requests. The storage gateway appliance 180 may provide hints to the intermediate server 130 to facilitate such optimizations in some implementations, e.g., based on patterns of I/O requests received from clients, the likelihood of a future request for a particular block may be estimated and provided to the intermediate server 130. The benefits of such optimizations may be particularly significant in embodiments in which the units in which data is typically transferred to and from the storage service (such as 4-megabyte chunks) are larger than the units in which clients typically perform reads and writes (often, a few kilobytes at a time). In such embodiments, the intermediate server 130 may have to retrieve more data from the storage service than specified in a client read request, simply because of the minimum unit of data transfer that the storage service 120 supports. As a consequence, transmitting additional data blocks to the storage gateway appliance 180 than requested by the client in anticipation of possible future requests, especially at a lower transfer priority, may not impose much overhead, and may help enhance the responsiveness of the storage gateway appliance to future client requests substantially.

Figure 13:
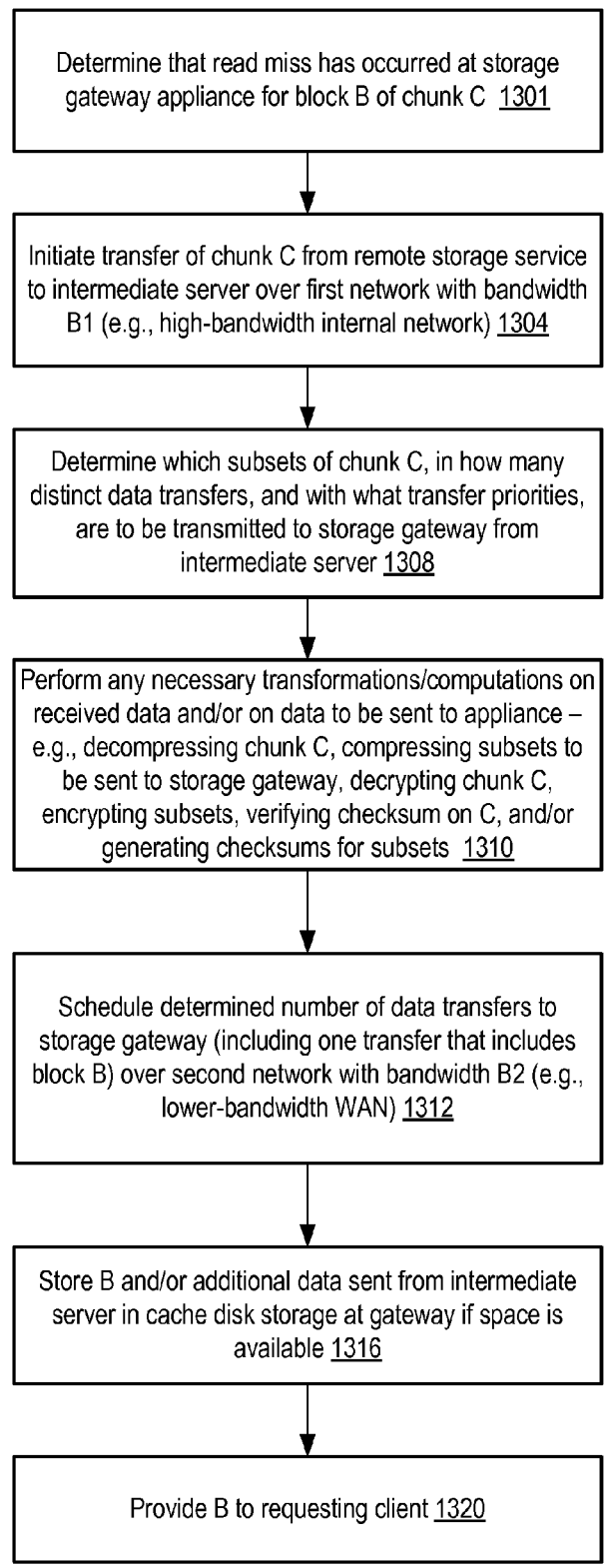
FIG. 13 is a flow diagram illustrating aspects of optimization operations that may be performed in an environment in which data is transmitted between a storage gateway appliance and an intermediate server over a low performance network link such as a WAN, according to at least some embodiments.

FIG. 13 is a flow diagram illustrating aspects of optimization operations that may be performed in an environment in which data is transmitted between a storage gateway appliance 180 and an intermediate server 130 over a low performance network such as a WAN, according to at least some embodiments. In the depicted embodiment, data may be transferred to and from the storage service in chunks, where each chunk comprises a plurality of data blocks. The chunk sizes and/or block sizes used may differ in various embodiments—for example, in one embodiment, each chunk may comprise 4 megabytes of data, comprised of 64 blocks of 64 kilobytes each, while in another embodiment, 8-megabyte chunks may be used with each chunk comprising 64 blocks of 128 kilobytes each. As shown in element 1301, a client read request for block B of a chunk C of a cached volume may result in a read miss, i.e., the requested data block B and chunk C may not be found in the cache being implemented using cache disks 250. A first data transfer comprising the chunk C may be initiated, from the remote storage service 120 to the intermediate server 130 (element 1304) over a first network path with a first bandwidth capacity W1.

The intermediate server 130 may be configured to determine which subsets of chunk C are to be transferred on to the storage gateway appliance 180, how many distinct data transfers are to be used to send the data to the storage gateway appliance, and/or the relative priorities of the data transfers (element 1308). At a minimum, the intermediate server 130 may decide to send only the bytes explicitly requested by the client. Depending on one or more criteria, the intermediate server 130 may decide to send more data than was explicitly requested, either within the same data transfer or in the form of additional transfers. Any of a variety of criteria may be used in different embodiments to determine the contents of the data transfer(s), such as the client access patterns observed (e.g., whether clients are accessing data from the volume to which B belongs randomly, with some spatial locality such that nearly blocks are accessed within a short amount of time, or sequentially), utilizations of the processors, memory, network and/or storage devices at the intermediate server or the appliance, measured latencies of network transfers to the appliance, or utilization levels or congestion characteristics of network links between the intermediate server 130 and the storage gateway appliance 180. The specific blocks to be included as part of a pre-fetch data transfer may be identified by the intermediate server 130, or hints as to which additional blocks should be sent may be provided by the storage gateway 180. For example, in one embodiment, if a read was requested for a portion or all of a block Bk of a chunk C, where block Bk starts at offset K within the chunk, the set of pre-fetched blocks may include all the blocks of the chunk that have offsets higher than K. In another embodiment, all the remaining blocks of the chunk (i.e., blocks other than Bk) may be included in the pre-fetched set, regardless of their offset.

In scenarios where the intermediate server 130 determines to send the data in more than one transfer, the relative priorities of the different transfers may be assigned based on some combination of similar criteria as those used to determine the number of data blocks to transmit. For example, a network transfer scheduler or packet scheduler may send the explicitly requested data at a high priority, and schedule any additional transfers at lower priorities in some embodiments. A number of different schemes may be used to implement different transfer priorities in various implementations—e.g., some network devices or paths may be designated for high priority transfers while other devices or paths may be set aside for lower priority transfers, or protocols that support multiple quality of service (QoS) levels may be used.

In some embodiments, data may be transferred from the storage service 120 to the intermediate server 130 in compressed format. Accordingly, the intermediate server 130 may decompress the data and extract the subset of the uncompressed data that is to be transferred to the storage gateway appliance 180 in such embodiments (element 1310). The extracted data may itself be compressed at the intermediate server 130 before its transfer to the storage gateway appliance 180. In one embodiment, the intermediate server 130 may also be responsible for performing other computations or transformations on the data—e.g., decrypting the received chunk C and encrypting the blocks being sent to the storage gateway 180, verifying that C has not been corrupted (e.g., with the help of a checksum value received from the storage service for the chunk C), and/or computing a respective checksum value for each of the data blocks or transfers to the storage gateway appliance 180 and transmitting the checksum values to the appliance. In some embodiments such operations may be performed only for the received data chunk, and not for the data sent on to the appliance—for example, the chunk may be received in a compressed format, decompressed at the intermediate server, and transferred in uncompressed format to the appliance. In other embodiments, the operations may be performed only for the data transfers to the appliance—for example, the chunk may be received at the intermediate server in uncompressed format, and the intermediate server may compress the data before transmitting it to the appliance. Similarly, in some embodiments checksums may be computed and transmitted only for the data sent from the intermediate server, and not for the chunks received at the intermediate server; or only for the chunks received, and not for the data sent from the intermediate server.

Having determined the number, content, and relative priorities of the data transfers, the intermediate server 130 may initiate the transfers to the storage gateway appliance 180 over an external network 144, such as a WAN, with a different (typically, lower) bandwidth capacity W2 than the capacity W1 of the network path between the storage service 120 and the intermediate server 130 (element 1312). When the data that was requested reaches the storage gateway appliance 180, it may be stored on local storage (e.g., chunks on cache disks 250) if sufficient space is available (element 1316). The requested data may be provided to the client, whether there was sufficient local storage space available or not, in at least some implementations (element 1320). Similarly, when additional blocks of chunk C arrive at the storage gateway, they may be stored in anticipation of future I/O requests if sufficient space is available on local storage, and may simply be discarded if space is not available in some embodiments. In at least one embodiment, if there is a shortage of free disk space at the storage gateway appliance 180, the appliance may provide an indication of low free space to the intermediate server 130, which may be used by the intermediate server 130 to determine how much data to transfer.

After a read request for a block B is received at the storage gateway appliance 180 and before the block B is received at the appliance from the intermediate server 130, a write request targeted to at least a portion of B may be received at the appliance. In such a scenario, the appliance may store the data modified by the client in its local storage (such as a cache disk 250) and merge the modifications with the block B when the latter is received from the intermediate server 130 in some embodiments.

In at least some embodiments, after a client requests a read for a particular block B1 of chunk C, the intermediate server 130 may schedule the transfer of additional data blocks B2, B3, . . . , Bn of the chunk C as described above. Before the additional blocks are received at the storage gateway appliance 180, another client request to read block Bk may be received, and the storage gateway appliance may accordingly transmit a request for Bk to the intermediate server 130. When the intermediate server 130 receives the request for Bk, it may respond as follows. If Bk is one of the additional data blocks B2, . . . Bn, and the transfer of Bk has already been initiated (and also depending in some implementations on other factors such as how long ago the additional pre-fetched blocks were sent), the intermediate server may in one embodiment ignore the new request for Bk, assuming that the in-progress transmission of Bk will be sufficient to meet the client's needs. If the blocks B2, . . . , Bn have already been sent at a low priority, the intermediate server 130 may schedule an additional high-priority transfer of Bk alone to the appliance 180 in some embodiments. If the blocks B2, . . . , Bn have not yet been transmitted, the intermediate server 130 may increase the priority of Bk's transfer in some embodiments. If the additional blocks B2, . . . , Bn do not comprise Bk, a high-priority transfer of Bk may be initiated from the intermediate server 130 to the appliance 180. Since Bk has already been downloaded as part of chunk C from the storage service 120, no additional downloads from the storage service 120 may be required.

In at least some embodiments, the storage gateway appliance 180 may be aware of the additional blocks that the intermediate server 130 is going to transfer. For example, in one implementation, the intermediate server 130 may be configured to always schedule the transfer of all the remaining blocks B2, . . . , Bx of a chunk C when a particular block B1 of chunk C is requested by a client, with the remaining blocks normally being transferred at a lower priority with respect to the requested block. If a request for block Bk of chunk C is received at the appliance after the request for B1 has been sent to the intermediate server 130 and before the remaining blocks B2, . . . , Bx are received at the appliance, the storage gateway appliance may respond to the new read request for Bk in one of several ways in different embodiments. In one embodiment, a new request for Bk may be sent to the intermediate server 130. In another embodiment, depending for example on metrics collected at the appliance for the time taken for other low-priority pre-fetch transfers in the recent past, the appliance 180 may simply wait for Bk to arrive as part of the low-priority transfer. In some embodiments, the appliance 180 may send a request for a high-priority transfer of Bk to the intermediate server and also request a cancellation of the low-priority transfer of Bk.

In some embodiments, an intermediate server 130 and/or a storage gateway appliance 180 may perform de-duplication operations which may help to reduce the total network traffic that occurs. Before sending a particular data chunk (or a portion of a chunk) to the remote storage service 120, or to a storage gateway appliance 180, for example, a hashing based de-duplication technique may be used in some embodiments to determine whether part or all of the data is already present at the intended destination of the data transfer, and if it is present, the data transfer may be avoided or reduced in size. It is noted that in some embodiments, at least some of the operations illustrated in the flow diagrams of FIG. 6, 7, 8, 9, 11, 12 or 13 may be performed in a different order than that shown, performed in parallel with other illustrated operations, or omitted.

Use Cases

The techniques described above of supporting efficient caching of client data at storage gateway appliances may be beneficial in a number of different environments. Clients with very large amounts of application data, only a subset of which typically has to accessed or manipulated within a given period of time, may be able to take advantage of the high performance offered by caching at the appliance, while relying on the security and reliability guarantees of the storage service for the bulk of their data. In at least some scenarios, clients may be able to deploy fairly cheap commodity storage hardware for the cache disks, while relying on the storage service for extremely high availability for the primary copy of the application data. Clients may be able to dynamically change the size of the cached portion of their data, thus accommodating changing workloads over time. The intelligent eviction techniques described above may help to reduce response time variations for client I/O requests, and the rapid recovery techniques may help to reduce the downtime associated with crashes.

The optimization features supported by the intermediate servers may allow cached volumes to be supported with high performance levels even in environments where relatively slow WAN links are required for data transfer between the storage gateway appliance and the intermediate servers. The interface management capabilities of the storage gateway appliance may efficiently support clients whose applications rely on a variety of different protocols—e.g., file system access protocols may be supported concurrently with block storage protocols by the same appliance. Cached volumes may be suitable for a variety of different applications including user home directories, backups, and database storage.

Illustrative Computer System

Figure 14:
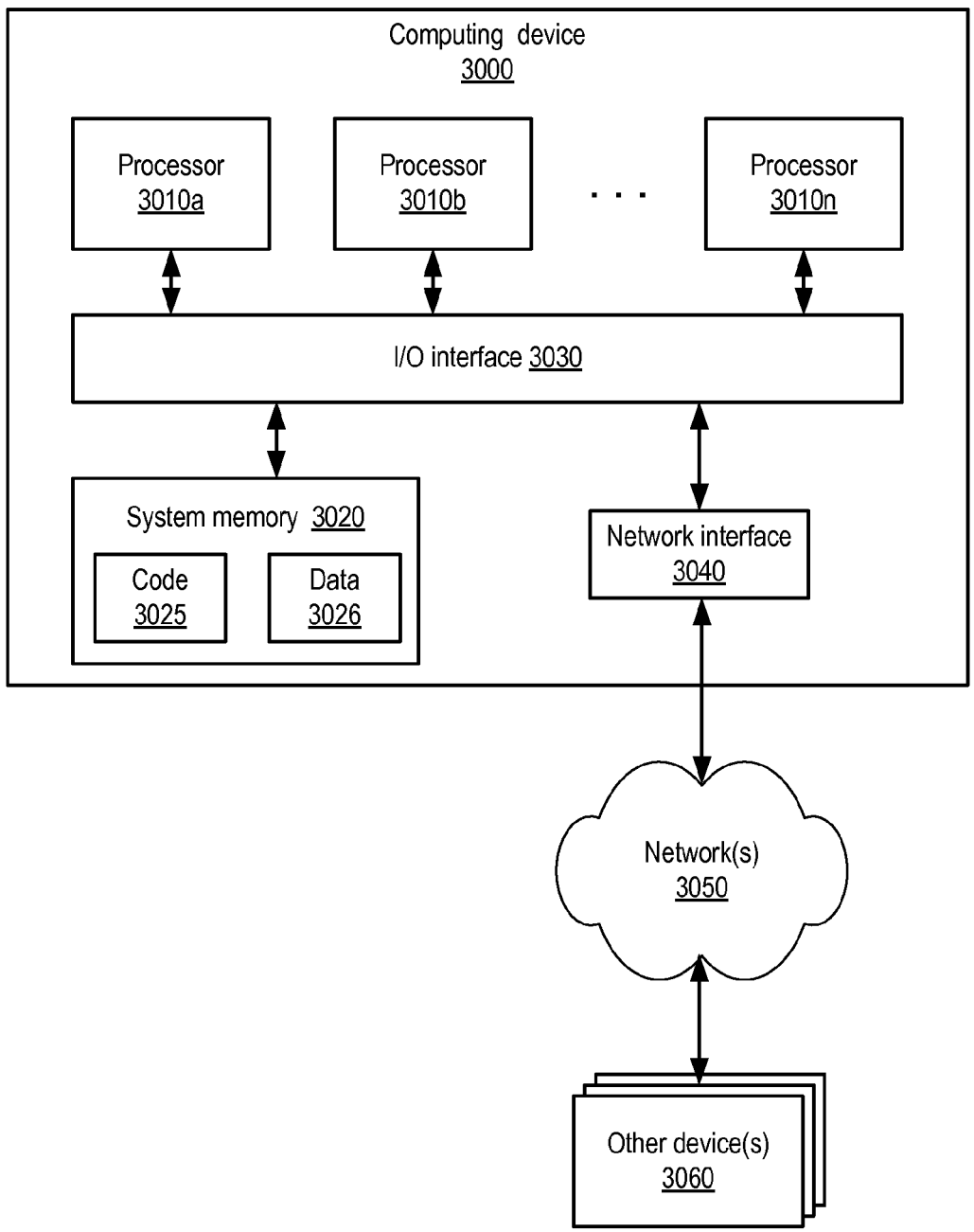
FIG. 14 is a block diagram illustrating an example computing device that may be used in some embodiments.

In at least some embodiments, a server that implements a portion or all of one or more of the technologies described herein, including the techniques to implement the functionality of the storage gateway appliance, the intermediate servers, and/or the storage service, may include a general-purpose computer system that includes or is configured to access one or more computer-accessible media. FIG. 14 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 13, for example. In various embodiments, network interface 3040 may support communication via any suitable wired or wireless general data networks, such as various types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A method, comprising:
   in response to a determination to bring a storage appliance into a running state after an unplanned shutdown, wherein the appliance is configured to cache a plurality of data chunks of a storage object of a remote storage service,
   reading into an in-memory metadata region, from a first metadata location of the appliance, chunk metadata corresponding to a particular data chunk of the plurality of data chunks;
   based at least in part on an analysis of a portion of the chunk metadata, storing an indication of a validation requirement in the in-memory metadata region for the particular data chunk;
   designating the particular data chunk as being accessible for input/output (I/O) requests after the indication of the validation requirement has been stored; and
   in response to receiving, after said designating, an I/O request targeted to at least a portion of the particular data chunk, validating at least a portion of the chunk metadata using a different metadata storage location of the appliance, prior to performing one or more I/O operations indicated in the I/O request.

2. The method as recited in claim 1, wherein the first metadata location comprises a portion of a first space of a storage device, wherein the first space is designated to store contiguous metadata for one or more cached data chunks of the storage object, including the particular data chunk; and wherein the different metadata location comprises an inline metadata section stored in a second space of the storage device, wherein the second space is configured to store the at least a portion of the particular data chunk.

3. The method as recited in claim 1, wherein the analysis comprises determining whether a caching state of the particular data chunk, as indicated within the chunk metadata, belongs to a particular set of caching states.

4. The method as recited in claim 1, further comprising:
   in response to the determination to bring the storage appliance into the running state,
   reading into the in-memory metadata region, from the first metadata location, second chunk metadata corresponding to a second data chunk of the plurality of data chunks;
   based at least in part on an analysis of the second chunk metadata, updating at least a portion of the second chunk metadata in the in-memory metadata region using contents of an inline metadata location of the appliance prior to accepting I/O requests targeted at the second data chunk.

5. The method as recited in claim 1, wherein the appliance comprises an upload buffer configured to store modified data of the storage object to be uploaded asynchronously to the remote storage service, further comprising:
   in response to the determination to bring the storage appliance into the running state, adding an entry to the upload buffer, wherein the entry comprises contents one or more data blocks of the particular data chunk.

6. A system, comprising:
   one or more hardware computing devices configured to:
      in response to a determination to bring a storage appliance into a running state after an unplanned shutdown, wherein the appliance is configured to cache a plurality of data chunks of a storage object of a remote storage service,
         read into an in-memory metadata region, from a first metadata location of the appliance, chunk metadata corresponding to a particular data chunk of the plurality of data chunks;
         based at least in part on an analysis of a portion of the chunk metadata, store an indication of a validation requirement for the particular data chunk;
         designate the particular data chunk as being accessible for input/output (I/O) requests after the indication of the validation requirement has been stored; and
      in response to receiving, after the designation of the particular data chunk, an I/O request targeted to at least a portion of the particular data chunk, validate at least a portion of the chunk metadata using a different metadata storage location of the appliance, prior to a completion of one or more I/O operations indicated in the I/O request.

7. The system as recited in claim 6, wherein the indication of the validation requirement is stored in the in-memory metadata region.

8. The system as recited in claim 6, wherein the first metadata location comprises a portion of a first space on a storage device, wherein the first space is designated to store contiguous metadata for one or more cached data chunks of the storage object, including the particular data chunk; and wherein the different metadata location comprises an inline metadata section stored in a second space of the storage device, wherein the second space is configured to store the at least a portion of the particular data chunk.

9. The system as recited in claim 8, wherein the particular data chunk comprises a plurality of data blocks, wherein each data block of the plurality of data blocks has a corresponding inline metadata section, and wherein, within the second space, the plurality of data blocks of the particular data chunk are arranged in an alternating sequence with the corresponding inline metadata sections.

10. The system as recited in claim 6, wherein the analysis comprises a determination of whether a caching state of the particular data chunk, as indicated within the chunk metadata, belongs to a particular set of caching states.

11. The system as recited in claim 6, wherein the one or more hardware computing devices are further configured to:
   in response to the determination to bring the storage appliance into the running state,
      read into the in-memory metadata region, from the first metadata location of the appliance, second chunk metadata corresponding to a second data chunk of the plurality of data chunks;
      update, in response to a detection of a particular indicator within the second chunk metadata, at least a portion of the second chunk metadata in the in-memory metadata region using contents of an inline metadata location of the appliance prior to accepting I/O requests targeted at the second data chunk.

12. The system as recited in claim 11, wherein the particular indicator comprises a metadata entry stored in the first metadata location by a cache evictor configured to free at least some cache storage of the appliance.

13. The system as recited in claim 11, wherein to update the at least a portion of the second chunk metadata, the one or more hardware computing devices are further configured to:
   compare an instance identifier stored in the second chunk metadata, indicative of a validity of a data block of the second data chunk, with an instance identifier stored in the inline metadata location.

14. The system as recited in claim 6, wherein the appliance comprises an upload buffer configured to store modified data of the storage object to be uploaded asynchronously to the remote storage service, wherein the one or more hardware computing devices are further configured to:
   in response to the determination to bring the storage appliance into the running state, add an entry to the upload buffer, wherein the entry comprises contents one or more data blocks of the particular data chunk.

15. A non-transitory computer-accessible storage medium storing program instructions that when executed on one or more processors:
   in response to a determination to bring a storage appliance into a running state after an unplanned shutdown, wherein the appliance is configured to cache a plurality of data chunks of a storage object of a remote storage service,
      read into an in-memory metadata region, from a first metadata location of the appliance, chunk metadata corresponding to a particular data chunk of the plurality of data chunks;
      based at least in part on an analysis of a portion of the chunk metadata, store an indication of a validation requirement for the particular data chunk;
      designate the particular data chunk as being accessible for input/output (I/O) requests after the indication of the validation requirement has been stored; and
   in response to receiving, after the designation of the particular data chunk, an I/O request targeted to at least a portion of the particular data chunk, validate at least a portion of the chunk metadata using a different metadata storage location of the appliance, prior to a completion of one or more I/O operations indicated in the I/O request.

16. The non-transitory computer-accessible storage medium as recited in claim 15, wherein the indication of the validation requirement is stored in the in-memory metadata region.

17. The non-transitory computer-accessible storage medium as recited in claim 15, wherein the first metadata location comprises a portion of a first space on a storage device, wherein the first space is designated to store contiguous metadata for one or more cached data chunks of the storage object, including the particular data chunk; and wherein the different metadata location comprises an inline metadata section stored in a second space of the storage device, wherein the second space is configured to store the at least a portion of the particular data chunk.

18. The non-transitory computer-accessible storage medium as recited in claim 17, wherein the particular data chunk comprises a plurality of data blocks, wherein each data block of the plurality of data blocks has a corresponding inline metadata section, and wherein, within the second space, the plurality of data blocks of the particular data chunk are arranged in an alternating sequence with the corresponding inline metadata sections.

19. The non-transitory computer-accessible storage medium as recited in claim 15, wherein the analysis comprises a determination of whether a caching state of the particular data chunk, as indicated within the chunk metadata, belongs to a particular set of caching states.

20. The non-transitory computer-accessible storage medium as recited in claim 15, wherein the instructions when executed on the one or more processors:
  in response to the determination to bring the storage appliance into the running state,
    read into the in-memory metadata region, from the first metadata location of the appliance, second chunk metadata corresponding to a second data chunk of the plurality of data chunks;
    update, in response to a detection of a particular indicator within the second chunk metadata, at least a portion of the second chunk metadata in the in-memory metadata region using contents of an inline metadata location of the appliance prior to accepting I/O requests targeted at the second data chunk.

21. The non-transitory computer-accessible storage medium as recited in claim 20, wherein the particular indicator comprises a metadata entry stored in the first metadata location by a cache evictor configured to free at least some cache storage of the appliance.

22. The non-transitory computer-accessible storage medium as recited in claim 20, wherein to update the at least a portion of the second chunk metadata, the instructions when executed on the one or more processors:
  compare an instance identifier stored in the second chunk metadata, indicative of a validity of a data block of the second data chunk, with an instance identifier stored in the inline metadata location.

23. The non-transitory computer-accessible storage medium as recited in claim 15, wherein the appliance comprises an upload buffer configured to store modified data of the storage object to be uploaded asynchronously to the remote storage service, wherein the instructions when executed on the one or more processors:
  in response to the determination to bring the storage appliance into the running state, add an entry to the upload buffer, wherein the entry comprises contents one or more data blocks of the particular data chunk.

* * * * *